(12) United States Patent
Nagaki et al.

(10) Patent No.: US 6,750,637 B2
(45) Date of Patent: Jun. 15, 2004

(54) SWITCHING POWER SUPPLY

(75) Inventors: Toshikazu Nagaki, Hirakata (JP); Yoshio Mizutani, Tsu (JP)

(73) Assignee: Matsushita Electric Co., Ltd., Osaka (JP)

( * ) Notice: Subject to any disclaimer, the term of this patent is extended or adjusted under 35 U.S.C. 154(b) by 0 days.

(21) Appl. No.: 10/298,979

(22) Filed: Nov. 19, 2002

(65) Prior Publication Data
US 2003/0095422 A1 May 22, 2003

(30) Foreign Application Priority Data
Nov. 20, 2001 (JP) ........................................ 2001-354209

(51) Int. Cl.$^7$ ................................................ G05F 1/40
(52) U.S. Cl. ........................................................ 323/272
(58) Field of Search ................................ 323/271, 272, 323/268

(56) References Cited

U.S. PATENT DOCUMENTS

| | | | |
|---|---|---|---|
| 4,257,090 A | * | 3/1981 | Kroger et al. ............... 363/65 |
| 4,338,658 A | | 7/1982 | Toy |
| 4,384,321 A | | 5/1983 | Rippel |
| 4,924,170 A | * | 5/1990 | Henze ........................ 323/272 |
| 5,852,557 A | | 12/1998 | Woodward |
| 5,892,352 A | | 4/1999 | Kolar et al. |
| 6,144,194 A | | 11/2000 | Varga |
| 6,211,657 B1 | | 4/2001 | Goluszek |
| 6,215,290 B1 | | 4/2001 | Yang et al. |

* cited by examiner

Primary Examiner—Shawn Riley
(74) Attorney, Agent, or Firm—Greenblum & Bernstein, P.L.C.

(57) ABSTRACT

A DC—DC conversion switching power supply is provided, including a plurality of DC—DC converters connected in parallel. A three-times frequency waveform which is generated from a three-times frequency waveform generation circuit, and is in sync with an oscillation frequency of the DC—DC converters is superimposed on a control voltage which is compared with a switching current signal in a current mode control circuit for controlling the DC—DC converters, or a signal proportional to the switching current signal to control a switching current pulse. Since superimposing the three-times frequency waveform which falls over one period increases the control voltage decreased by switch-on noise of the other DC—DC converter, malfunction at a switch-on phase of the other DC—DC converter, caused by the decrease of the control pulse width, is prevented.

15 Claims, 34 Drawing Sheets

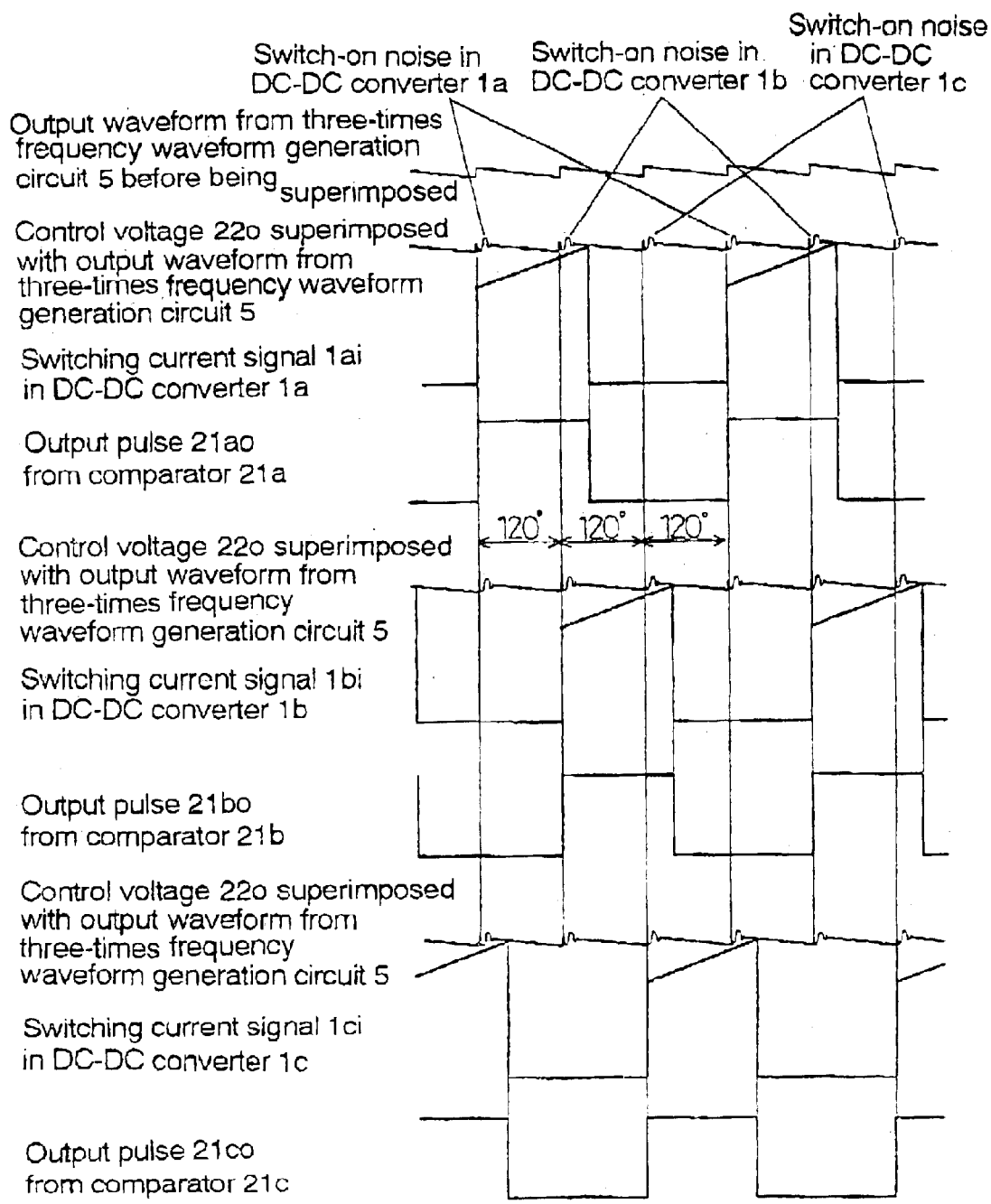

Fig. 30A
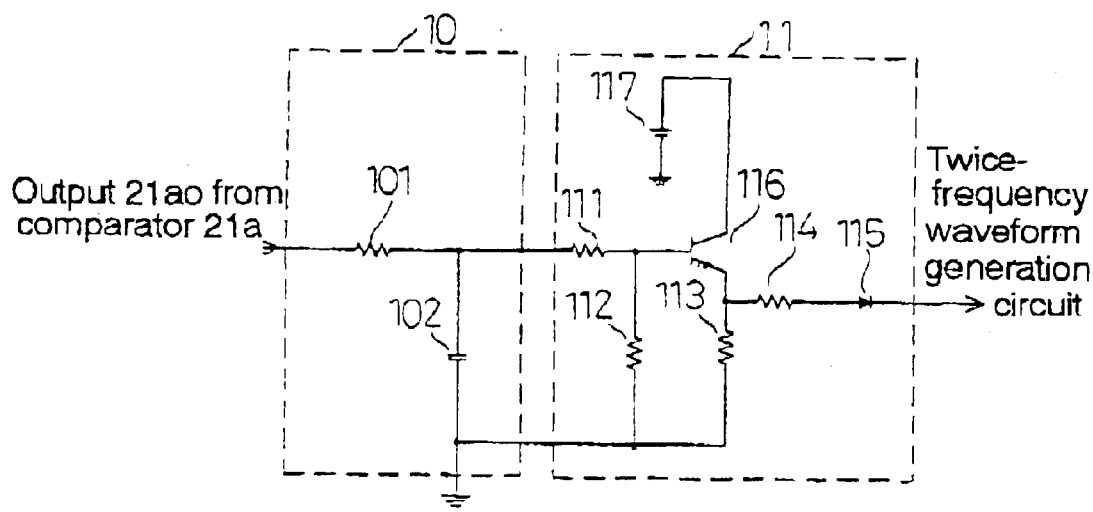
Fig. 30B
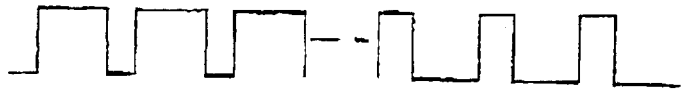
Capacitor 102
Current to twice-
frequency waveform
generation circuit

Prior Art
Fig. 35A
Control voltage 22o without superimposed switching noise
Fig. 35B
Control voltage 22o with superimposed switching noise
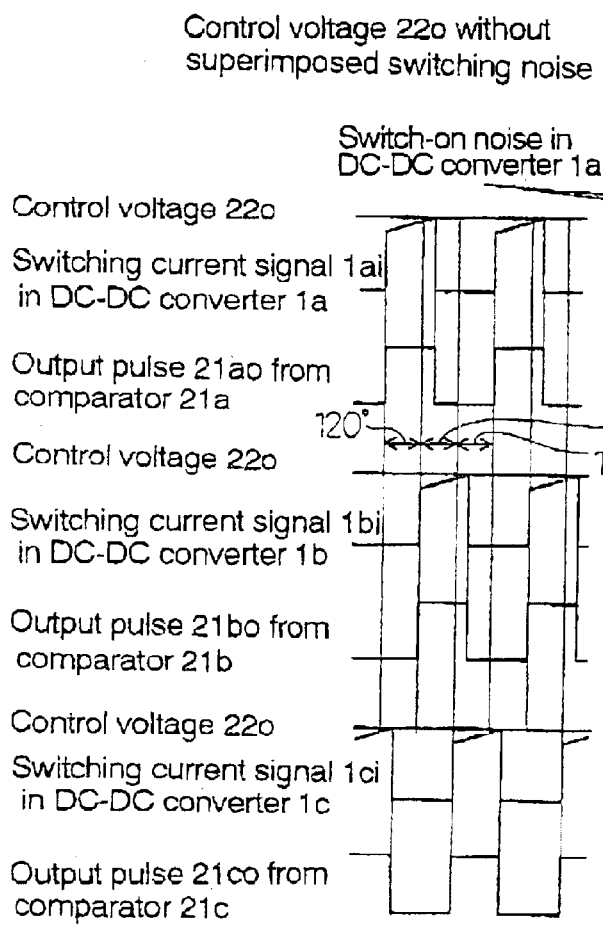
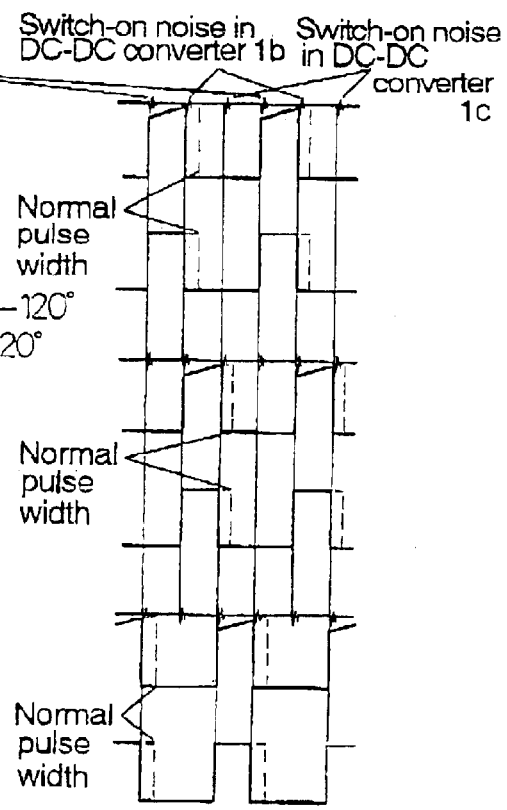

SWITCHING POWER SUPPLY

The present disclosure relates to subject matter contained in priority Japanese Patent Application No. 2001-354209, filed on Nov. 20, 2001, the contents of which is herein expressly incorporated by reference in its entirety.

BACKGROUND OF THE INVENTION

1. Field of the Invention

The present invention relates to a DC—DC conversion switching power supply, and more particularly relates to a switching power supply including a plurality of DC—DC converters connected in parallel.

2. Description of Related Art

It has been known that a plurality of switching power supplies, or DC—DC converters therefor are connected in parallel to increase their efficiency as well as to decrease the size and weight of a DC—DC conversion switching power supply for supplying medium or high power. Recently, in particular, a type called the "interleave type"—which displaces the phase of a switching current of the switching power supplies, or the DC—DC converters, connected in parallel to one another—is often used to decrease the effective value of an input current, thereby increasing efficiency.

FIG. 34 shows a conventional interleave type switching power supply including triple parallel circuit constitution. In this drawing, the reference numerals $1a$, $1b$, and $1c$ respectively denote first, second, and third DC—DC converters, while the reference numerals $1ai$, $1bi$, and $1ci$ respectively denote switching current signals of the DC—DC converters $1a$, $1b$, and $1c$. The reference numeral 2 denotes a current mode control circuit, while the reference numerals $21a$, $21b$, and $21c$ respectively denote first, second, and third comparators, and the reference numerals $21ao$, $21bo$, and $21co$ respectively denote output pulses from the comparators $21a$, $21b$, and $21c$. The reference numeral 22 denotes a detection signal control circuit, while the reference numeral $22o$ denotes a control voltage of the detection signal control circuit 22. The reference numeral 3 denotes a DC power supply, and 4 denotes a load. While a phase delay circuit for the switching current (which displaces the phases of the switching current of the DC—DC converters $1a$, $1b$, and $1c$) is required for the interleave, details of the phase delay circuit are not necessary for describing this part of the apparatus and are omitted from this drawing.

The current mode control circuit 2 uses the detection signal control circuit 22 to detect output voltages, or output currents, from the DC—DC converters $1a$, $1b$, and $1c$ connected in parallel. This creates a controlling output voltage $22o$ which is compared with the switching current signals $1ai$, $1bi$, and $1ci$ respectively by the comparators $21a$, $21b$, and $21c$. This results in the individual output pulses $21ao$, $21bo$, and $21co$. These output pulses $21ao$, $21bo$, and $21co$ are then used to control operation such that the peaks of the switching current signals $1ai$, $1bi$, and $1ci$ of the respective DC—DC converters $1a$, $1b$, and $1c$ are equal to the control voltage $22o$. As a result, the output voltages or currents from the DC—DC converters $1a$, $1b$, and $1c$ are controlled so as to be constant.

FIG. 35A shows the basic waveforms of the control voltage $22o$, the switching current signals $1ai$, $1bi$, and $1ci$, and the output pulses $21ao$, $21bo$, and $21co$. However, a spike current, and an in-circuit resonance current, flow in the DC—DC converters $1a$, $1b$, and $1c$ every time the switching current turns on or off. These DC—DC converters $1a$, $1b$, and $1c$, and the current mode control circuit 2, are connected to each other at several points including: a detection input of the detection signal control circuit 22; the input for the switching current signals $1ai$, $1bi$, and $1ci$ of the comparators $21a$, $21b$, and $21c$; lines for the output pulses $21ao$, $21bo$, and $21co$, and the line for 0V (or ground). As a result, the spike current and the in-circuit resonance current generated in the DC—DC converters $1a$, $1b$, and $1c$, when turning on and off, can flow into the current mode control circuit 2 through these connection loops.

In addition, when the DC—DC converters $1a$, $1b$, and $1c$, or circuits for driving a switch in the DC—DC converters ($1a$, $1b$, and $1c$), are provided on the same printed circuit board as the current mode control circuit 2, if their locations and connections are close to one another, the spike current and the in-circuit resonance current generated in the DC—DC converters $1a$, $1b$, and $1c$ are often superimposed on signals in the current mode control circuit 2 as a ripple noise, due to electromagnetic induction or the like.

The spike current flowing into the current mode control circuit 2, and the ripple noise superimposed on the signals in the current mode control circuit 2, can be considerably reduced by the connection method and the arrangement of the circuits. However, it is difficult to completely eliminate these effects, and they can also be superimposed on the control voltage $22o$ as a ripple noise.

If this is the case, a malfunction can result where the output pulses $21ao$, $21bo$, and $21co$ become narrower than their normal pulse width. This is shown in FIG. 35B. The control voltage $22o$, on which the ripple noise is superimposed, acts as a switch-on noise or a ripple potential, resulting in a decrease in the control voltage $22o$. More specifically, when the decrease in the control voltage $22o$, due to the noise and ripples caused by the turning on and off of the switching current of the other DC—DC converters, occurs within the range of the normal pulse width of the DC—DC converter, the peaks of the switching current signals $1ai$, $1bi$, and $1ci$ are compared with the decreased control voltage $22o$. As a consequence, the width of the output pulses $21ao$, $21bo$, and $21co$ decreases.

Additionally, since the detection signal control circuit 22 controls the output voltage or current so as to be constant, narrow pulses caused by malfunction (as above), and wide pulses compensating decreases of the output voltage or current caused by the malfunction, become mixed. The resulting state from this mixing changes depending on conditions of: the input voltage 3 and the load 4; input/output filter parameters in the DC—DC converters $1a$, $1b$, and $1c$; and the response speed of the detection signal control circuit 22. Consequently, the ripple component of the output voltage or current fluctuates largely and irregularly compared with the current and voltage characteristics of normal operation. Also, since a switching current with different peaks irregularly flows in inductor components, such as a transformer or a choke in the DC—DC converters $1a$, $1b$, and $1c$, mechanical vibration from gaps in a core, or from insulation tape between windings, generates noise.

As described above, when the plurality of DC—DC converters connected in parallel for a conventional interleave construction are controlled by a single current mode control circuit, the width of the controlling output pulses become narrower due to noise and ripples superimposed on the control voltage $22o$ by the spike current and in-circuit resonance current generated when the switching current in the other DC—DC converters turns on and off. As a result, the ripple component of the output voltage or current fluctuates significantly and irregularly. As a consequence, inductor components in the DC—DC converters, such as the transformer and choke, generate noise.

SUMMARY OF THE INVENTION

In light of the foregoing, an object of the present invention is to provide an interleave type switching power supply which does not generate the malfunction caused by fluctuations of the pulse width, the ripple fluctuation of the output voltage or current, and the noise from the inductor components in the DC—DC converters under the current mode control-with the interleave constitution.

A switching power supply of the present invention includes: a current mode control circuit for controlling a switching current pulse by comparing a switching current signal or a signal proportional to the switching current signal with a control voltage; a plurality (N) of DC—DC converters connected in parallel and controlled by the current mode control circuit; and an N-times frequency waveform generation circuit for generating a waveform with a frequency N times of an oscillation frequency of the DC—DC converters in sync with this oscillation frequency, to superimpose it on the control voltage.

With the constitution above, since superimposing the output from the N-times frequency waveform generation circuit on the control voltage practically increases the control voltage substantially having been decreased by the superimposed noise and ripple, the malfunction caused by the fluctuations of the pulse width is not generated in the current mode control with the interleave constitution, and thus, an interleave type switching power supply which does not generate the ripple fluctuation of the output voltage or current and the noise from the inductor components is constituted.

In addition, the output of the N-times frequency waveform which is generated by the N-times frequency waveform generation circuit, and is superimposed on the control voltage can be in phase with the turning-on phase of the switching current signal or a signal in phase with the switching current signal.

On the other hand, when the output of the N-times frequency waveform which is generated by the N-times frequency waveform generation circuit, and is superimposed on the control voltage is in phase with the turning-off phase of the switching current signal or a signal in phase with the switching current signal, the actions and the effects above are provided even when a change in the pulse width is large.

Further, when the output of the N-times frequency waveform which is generated by the N-times frequency waveform generation circuit, and is superimposed on the control voltage is in phase with a phase arbitrarily delayed from the turning-on phase or turning-off phase of the switching current signal or a signal in phase with the switching current signal, the actions and the effects above are also provided even when the change in the pulse width is large.

Additionally, the switching power supply may include the current mode control circuit described above, two DC—DC converters connected in parallel and controlled by the current mode control circuit, and a twice-frequency waveform generation circuit for generating a waveform with a frequency twice of an oscillation frequency of the DC—DC converters in sync with this oscillation frequency, and simultaneously in phase with the turning-on phase or turning-off phase of the switching current signal or a signal in phase with this switching current signal, to superimpose it on the control voltage. Here the twice-frequency waveform generation circuit may serve as a slope compensation circuit. This restrains a decrease of the control range largely, and thus avoids a decrease of the input/output range caused by the addition of the slope compensation compared with a case where a slope compensation waveform is added to the switching current signal.

In addition, the switching power supply may include the current mode control circuit described above, a plurality (N) of DC—DC converters connected in parallel and controlled by the current mode control circuit, and a next phase synchronized waveform generation circuit for generating a voltage waveform starting from the turning-on phase of the switching current signal of a (K+1)th DC—DC converter or a signal in phase with this switching current signal, and rising as time elapses, to superimpose this voltage waveform on the switching current signal or the signal proportional to the switching current signal of a Kth DC—DC converter. This restrains the decrease of the control range largely, and thus avoids the decrease of the input/output range caused by the addition of the slope compensation even under a condition requiring the slope compensation.

Further, the switching power supply may include the current mode control circuit and the DC—DC converters described above, and a ($\delta$=0.5) synchronized waveform generation circuit for generating a voltage waveform starting from a phase delayed by 0.5 of an on-time ratio ($\delta$) from the turning-on phase of the switching current signal of the DC—DC converter or a signal in phase with this switching current signal, and rising as time elapses, to superimpose this voltage waveform on the switching current signal or the signal proportional to the switching current signal of the DC—DC converts. This restrains the decrease of the control range largely even further, and thus avoids the decrease of the input/output range caused by the addition of the slope compensation even under the condition requiring the slope compensation.

Additionally, the switching power supply may include the current mode control circuit, the DC—DC converters, the N-times frequency waveform generation circuit for generating a waveform with a frequency N times of an oscillation frequency of the DC—DC converters in sync with this oscillation frequency, to superimpose it on the control voltage, and an on/off circuit for switching the N-times frequency waveform generation circuit between on and off. This makes it possible to turn off the superimpose of the N-times frequency waveform so as to smoothly conduct constant current transition without the malfunction caused by the superimpose if a constant current control is applied to a load such as a battery.

In addition, the switching power supply may include the current mode control circuit, the DC—DC converters, the N-times frequency waveform generation circuit for generating a waveform with a frequency N times of an oscillation frequency of the DC—DC converters in sync with this oscillation frequency, to superimpose it on the control voltage, and a changing circuit for increasing/decreasing the output level of the N-times frequency waveform generation circuit. This makes it possible to smoothly change the N-times frequency waveform to be superimposed so as to smoothly conduct constant current transition without the malfunction caused by the superimpose when constant current control is applied to a load such as a battery.

Further, it is preferable to constitute the switching circuit and the variable circuit so as to operate based on detecting the on-time ratio ($\delta$) of the DC—DC converters.

Additionally, it is preferable that the DC—DC converters have a bidirectional conversion function, and the current mode control circuit is switched between controlling the input and output of the DC—DC converters based on an external signal.

In addition, the actions and the effects above are remarkable when a load or a power supply connected with an input or output of the DC—DC converters is a battery.

Further, it is preferable that the output voltage waveform from the N-times frequency waveform generation circuit over one period decreases as time elapses.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 2 is a waveform diagram of the switching power supply of the first embodiment;

FIG. 3A is a circuit diagram, and FIG. 3B is a waveform diagram;

FIG. 6A is a circuit diagram, and FIG. 6B is a waveform diagram;

FIG. 8A is a circuit diagram, and FIG. 8B is a waveform diagram;

FIG. 10A is a circuit diagram, and FIG. 10B and FIG. 10C are waveform diagrams;

FIG. 15A shows the slope compensation quantity when a slope compensation circuit is added to the first embodiment, and FIG. 15B shows the slope compensation quantity in the fourth embodiment;

FIG. 1A is a circuit diagram, and FIG. 18B is a waveform diagram;

FIG. 22A is a circuit diagram, and FIG. 22B is a waveform diagram of the sixth embodiment;

FIG. 26A is an output current/output voltage characteristic chart, and FIG. 26B is an output current/$\delta$ characteristic chart;

FIG. 27A is a circuit diagram, and FIG. 27B is a waveform diagram;

FIGS. 30A and 30B show an example of a specific constitution of a $\delta$ detection circuit and a twice-frequency waveform voltage changing circuit in the eighth embodiment, FIG. 30A is a circuit diagram, and FIG. 30B is a waveform diagram;

FIGS. 35A and 35B are waveform diagrams of the prior art, FIG. 35A is a basic waveform diagram for a control voltage, switching current signals, and output pulses from comparators, and FIG. 35B is a waveform diagram for the control voltage, the switching current signals, and the output pulses from the comparators during malfunction caused by switch-on noise.

DETAILED DESCRIPTION OF THE PREFERRED EMBODIMENTS

Hereinafter, embodiments of a switching power supply of the present invention will be described with reference to the accompanying drawings of FIG. 1 to FIG. 33.

(First Embodiment)

Figure 1:
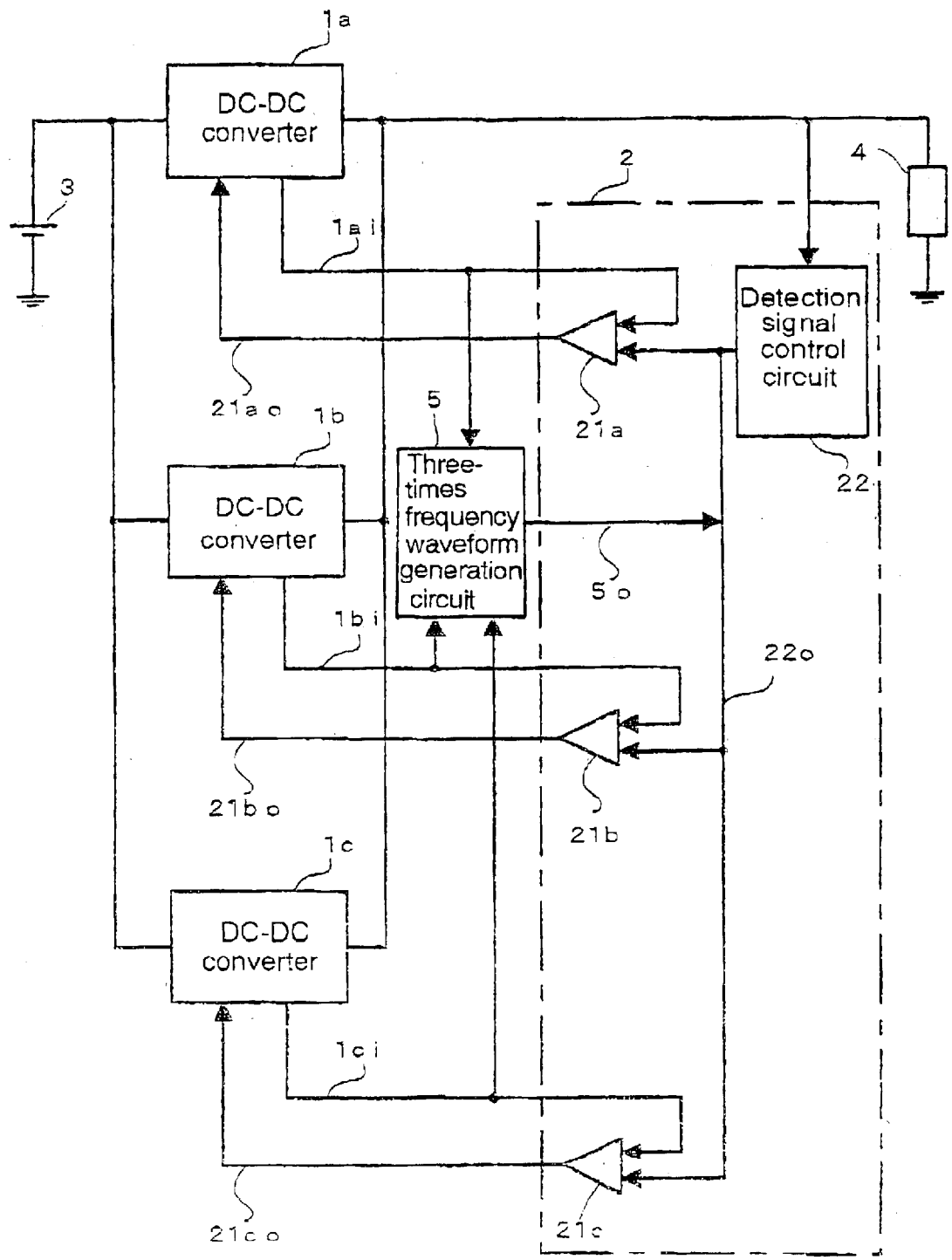
FIG. 1 is a block diagram of a switching power supply of a first embodiment of the present invention.

First, the following section describes a switching power supply of a first embodiment of the present invention while referring to FIG. 1 to FIG. 4. As shown in FIG. 1, the switching power supply of the present embodiment includes a current mode control circuit 2, DC—DC converters, 1a, 1b, and 1c, and a three-times frequency waveform generation circuit 5. The current mode control circuit 2 compares a switching current signal or a signal proportional to this signal with a control voltage so as to control the switching current pulse. The DC—DC converters 1a, 1b, and 1c are connected in parallel, and are controlled by the current mode control circuit 2. The three-times frequency waveform generation circuit 5 generates a waveform with a frequency three times of an oscillation frequency of the DC—DC converters in sync with this oscillation frequency, thereby superimposing it on the control voltage.

Figure 3A:
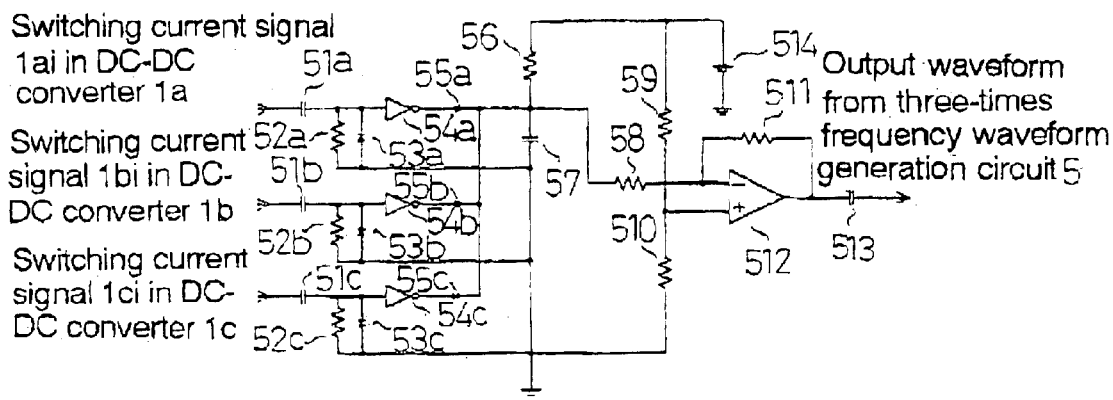
FIGS. 3A and 3B show an example of a specific constitution of a three-times frequency waveform generation circuit in the switching power supply of the first embodiment.
Figure 3B:
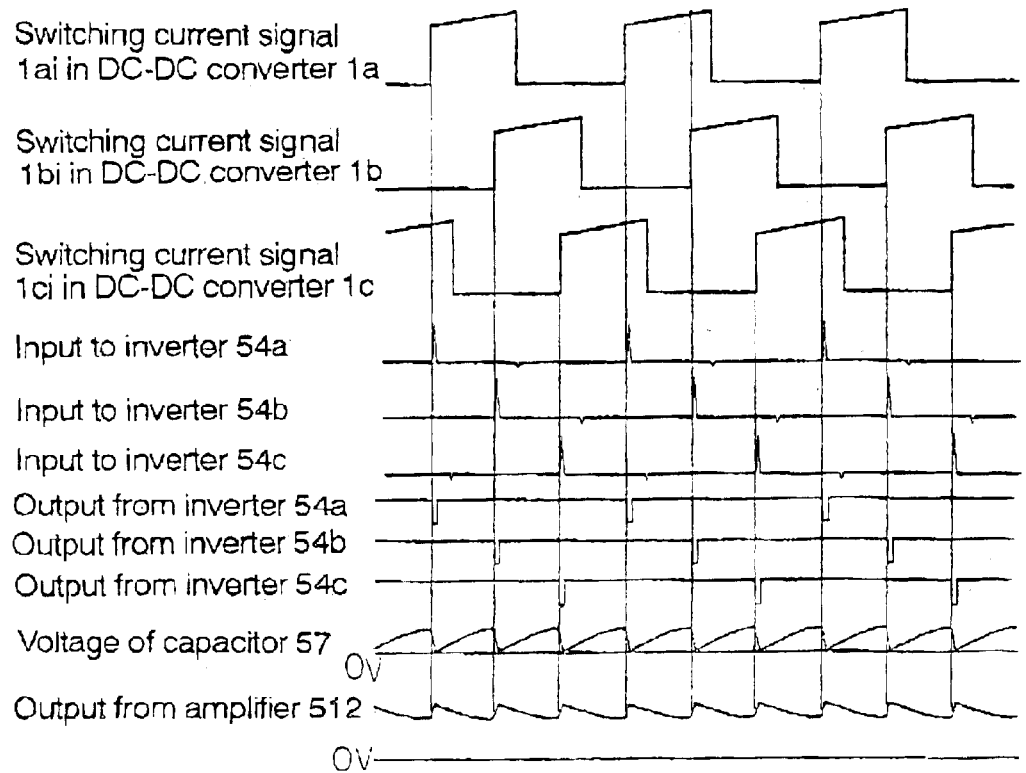
Figure 4:
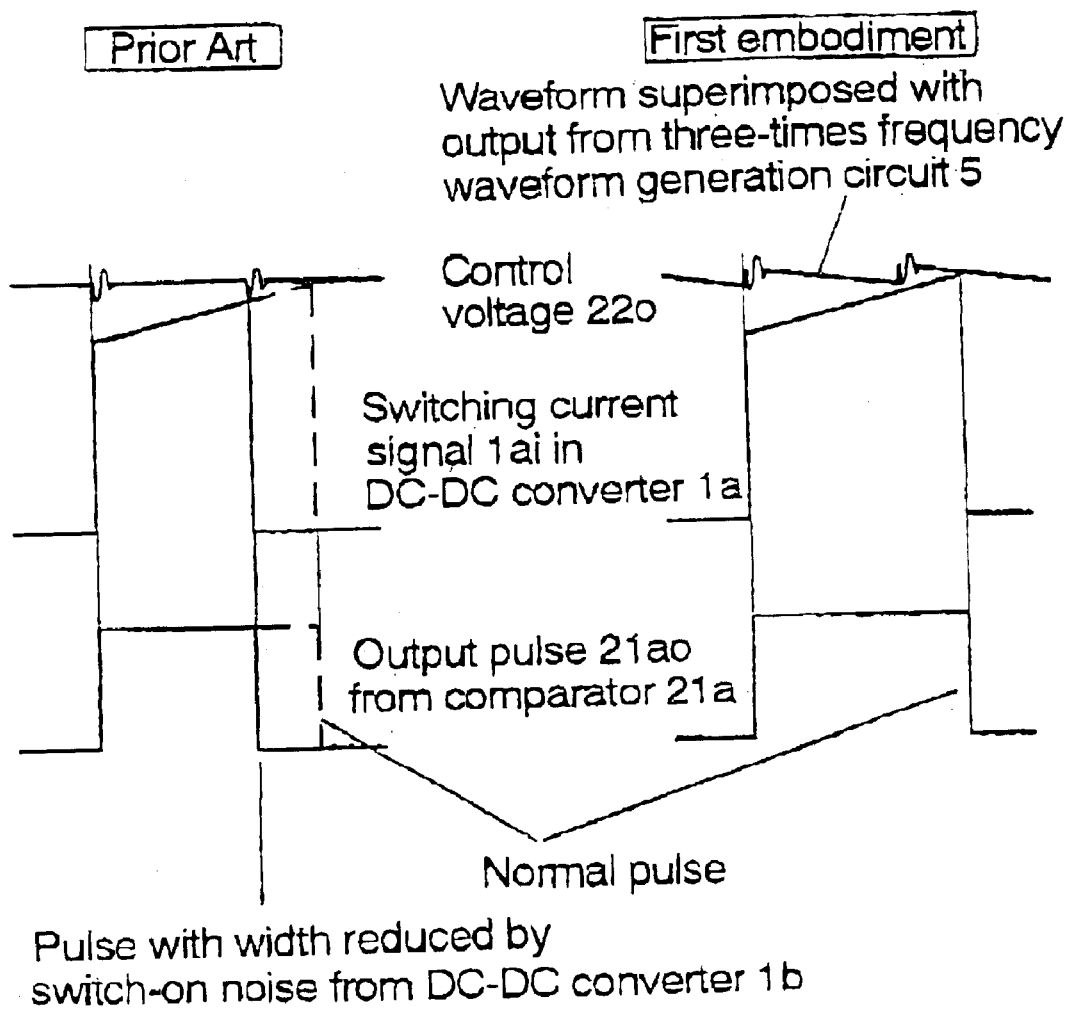
FIG. 4 is an explanatory diagram showing a comparison of a relationship among a control voltage, a switching current signal, and an output pulse from a comparator in a switching power supply of the prior art with that of the first embodiment.

Elements which have the same function and constitution as those in the conventional switching power supply are assigned with the same reference numeral, and descriptions therefor are not provided. FIG. 2 shows an output waveform from the three-times frequency waveform generation circuit 5 before the superimposing, the control voltage 22o on which the output waveform from the three-times frequency waveform generation circuit 5 is superimposed, the switching current signals 1ai, 1bi, and 1ci, and the output pulses 21ao, 21bo, and 21co. FIG. 3A shows a specific example of the constitution of the three-times frequency waveform generation circuit 5, and FIG. 3B shows waveforms at individual points in this circuit. FIG. 4 shows a comparison of a relationship between the control voltage 22o and the switching current signal 1ai in the prior art with that in the present embodiment.

The three-times frequency waveform generation circuit 5 uses the switching current signals 1ai, 1bi, and 1ci of the DC—DC converters 1a, 1b, and 1c as inputs for synchronizing an oscillation frequency in the present embodiment. Also, the three-times frequency waveform is in phase with the turning-on phase of the switching current signals 1ai, 1bi, and 1ci.

The following section briefly describes an example of a specific constitution of the three-times frequency waveform generation circuit 5 while referring to FIG. 3A. A differentiation circuit comprising a capacitor 51a and a resistor 52a converts a rise and a fall of the switching current signal 1ai into spike pulses. However, since the spike pulse at the fall is clamped by a diode 53a, only the positive pulse is impressed on the input of an inverter 54a. The output from the inverter 54a is a pulse output which becomes low only at the rise phase of the switching current signal 1ai. A capacitor 57 charged by a DC power supply 514 through a resistor 56 is discharged to the individual inverter output through the diode 55a, 55b, or 55c when the output of the inverters 54a, 54b, and 54c is at low level. Consequently, the capacitor 57 starts being charged in sync with the rise of the switching current signals 1ai, 1bi, and 1ci, and thus, generates a three-times frequency waveform. The waveform is invertingly amplified by resistors 58, 59, 510, and 511, and an amplifier 512, and then, only an AC component as an output 5o from the three-times frequency waveform generation circuit 5 is superimposed through a capacitor 513 on the control voltage 22o provided from the detection signal control circuit 22 in the current mode control circuit 2.

FIG. 3B shows waveforms of the switching current signals 1ai, 1bi, and 1ci, the inputs and the outputs of the inventers 54a, 54b, and 54c, the voltage of the capacitor 57, and the output from the amplifier 512. When a constant current diode or a constant current circuit is used in place of the resistor 56, the waveform generated by the capacitor 57 becomes a triangular wave. While FIG. 3A shows an example of the three-times frequency waveform generation circuit 5, this circuit is not limited to this example, and is constituted by various circuits.

When a phase of the noise and ripple caused by the turning on and off of the switching current in the other DC—DC converter exists during the period of a normal pulse width in a conventional example, since the peaks of the switching current signals 1ai, 1bi, and 1ci are compared with the control voltage 22o which is decreased by the superimposed noise and the ripple, the pulse width of the output pulses 21ao, 21bo, and 21co becomes narrower than a normal pulse width as shown in FIG. 4. However, since the output 5o from the three-times frequency waveform generation circuit 5 superimposes the voltage waveform which falls over one period on the control voltage 22o in the present embodiment, the electric potential of the control voltage 22o which is practically decreased by the superimposed noise and ripple increases. The decrease of the pulse width caused by the noise generated by the turning on of the switching current in the other DC—DC converter is prevented by setting the voltage drop of the waveform which is superimposed with the output 5o such that the sum of this voltage drop and the rise of the switching current signals 1ai, 1bi, and 1ci exceed the voltage drop by the superimposed noise and the ripple in the period between the phase of the noise caused by the turning on of the switching current in the other DC—DC converter and the fall of the normal pulse. As a result, an irregular ripple fluctuation does not occur on the output voltage or current, and simultaneously, an inductor part in the DC—DC converters does not generate noise. In addition, since the three-times frequency waveform is in sync with the oscillation frequency of the individual DC—DC converters 1a, 1b, and 1c, and the same waveform in the same phase is impressed on the comparators 21a, 21b, and 21c, the switching current signals 1ai, 1bi, and 1ci are made the same waveform. As a result, the powers of the individual DC—DC converters 1a, 1b, and 1c are equalized, thereby preventing a decrease of the reliability caused by the imbalanced power.

Figure 34:
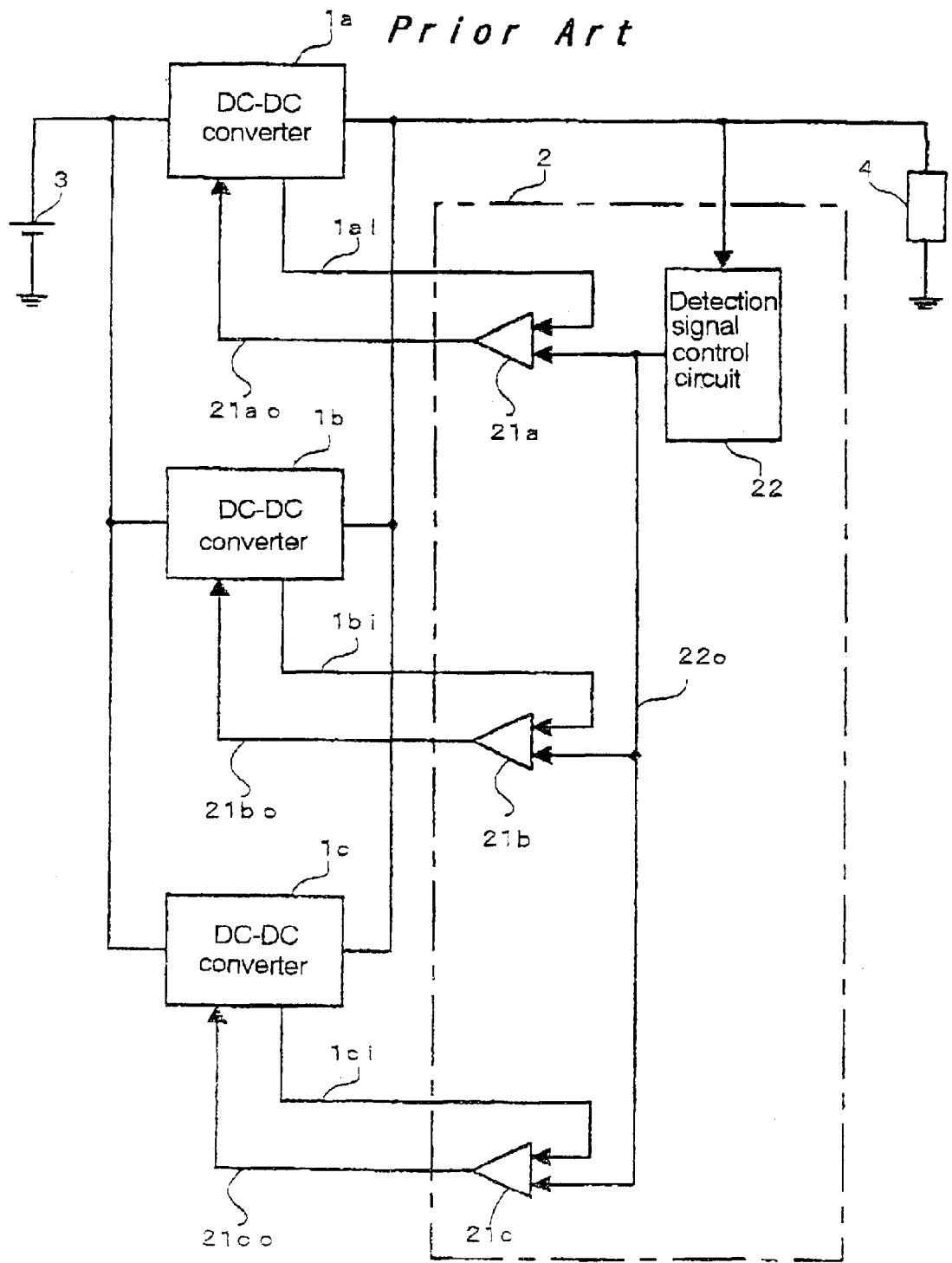
FIG. 34 is a block diagram of an interleave type switching power supply of the prior art.

As described above, the switching power supply of the first embodiment does not generate the decrease of the pulse width while the conventional example does in the current mode control with the interleave constitution as shown in FIG. 34. Thus, it is possible to constitute an interleave type switching power supply which does not present an irregular ripple fluctuation in the output voltage or current, and noise from the inductor components in the DC—DC converters.

Though a specific constitution of the DC—DC converter is not shown, any type whether it is isolated or non-isolated can embody the constitution.

(Second Embodiment)

Figure 5:
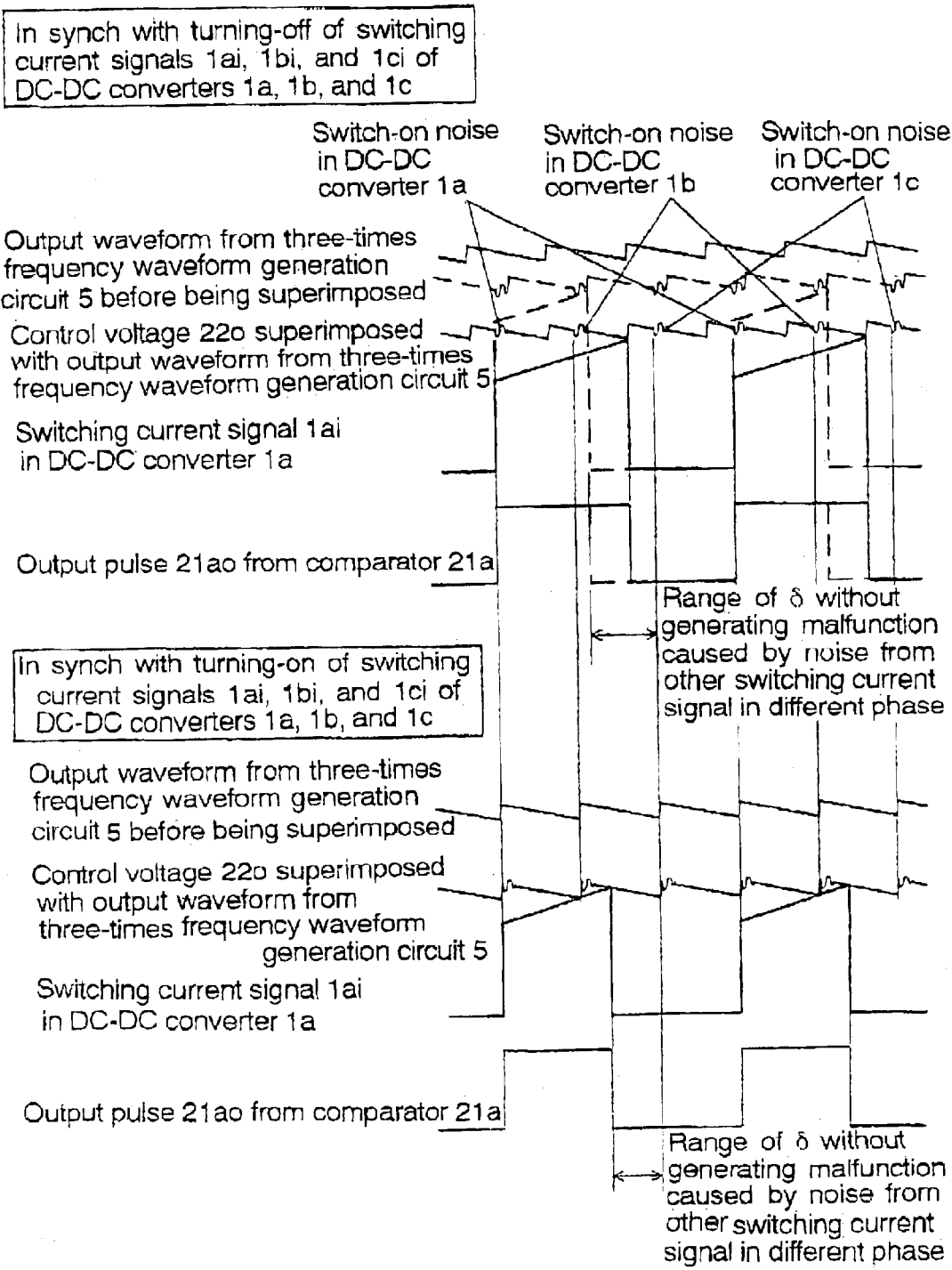
FIG. 5 is an explanatory diagram showing a comparison of a relationship among the control voltage, the switching current signal and the output pulse from the comparator in the switching power supply of the first embodiment with that of a second embodiment.
Figure 6A:
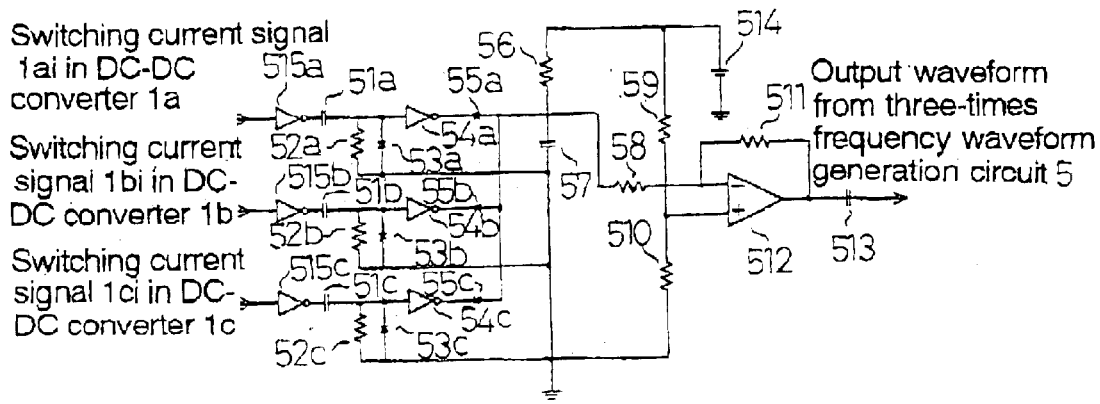
FIGS. 6A and 6B show an example of a specific constitution of a three-times frequency waveform generation circuit in the switching power supply of the second embodiment.
Figure 6B:
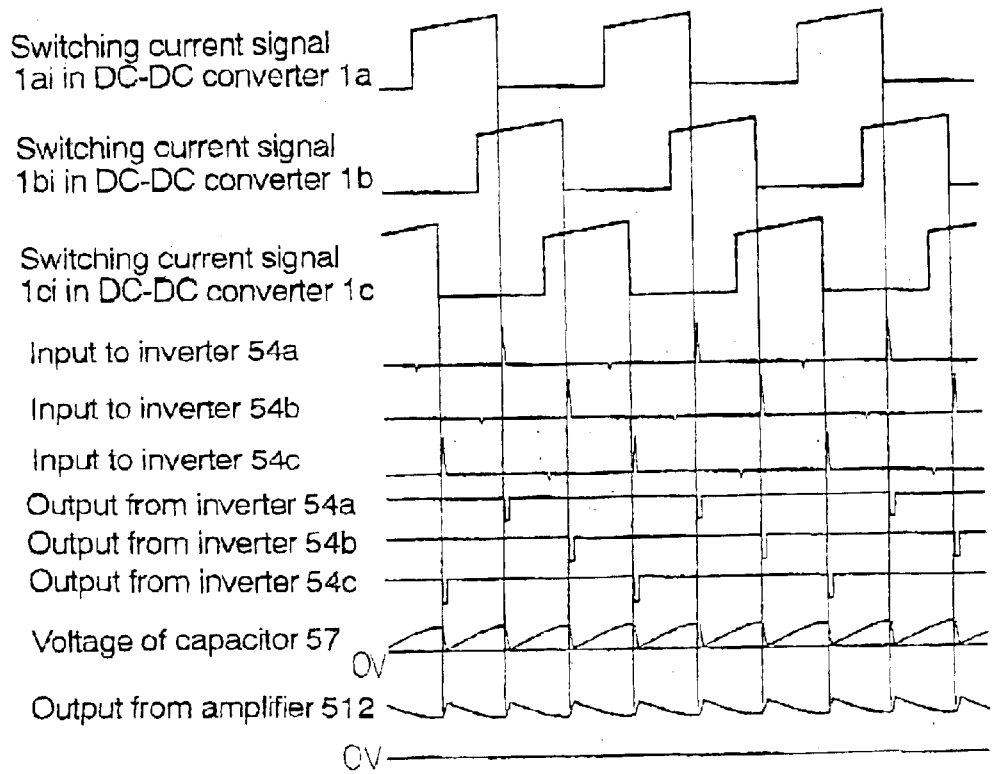

The following section describes a switching power supply of a second embodiment of the present invention while referring to FIG. 5 to FIG. 6B. A block diagram for the present embodiment is identical to the block diagram (FIG. 1) of the first embodiment. The present embodiment is different from the switching power supply of the first embodiment only in that the output 5o of the three-times frequency waveform generation circuit 5 is in phase with the turning-off phase of the switching current signal or a signal in phase with this signal (referred to as switching current signal or the like hereafter). Since all the other parts have constitutions and functions identical to those in the first embodiment, the same reference numerals are assigned to these parts, descriptions therefore are not provided, and description is provided only for the point that the output 5o of the three-times frequency waveform generation circuit 5 is in phase with the turning-off phase of the switching current signal or the like.

FIG. 5 shows a comparison of a relationship between the control voltage 22o and the switching current signal 1ai in the first embodiment with that in the present embodiment. FIG. 6A shows an example of a specific constitution of the three-times frequency generation circuit 5 whose output 5o is in phase with the turning-off phase of the switching current signal or the like, and FIG. 6B shows waveforms at individual points.

The example of a specific constitution of the three-times frequency waveform generation circuit 5 in FIG. 6A is different from that of the first embodiment only in adding inverters 515a, 515b, and 515c to the individual inputs of the specific constitution example in FIG. 3A so as to make the output 5o in phase with the turning-off phase of the switching current signal or the like. The capacitor 57 starts being charged by the operation of the added inverters 515a, 515b, and 515c as shown in FIG. 6B in sync with the individual fall of the switching current signals 1ai, 1bi, and 1ci, and thus generates a corresponding three-times frequency waveform. Consequently the output 5o superimposed on the control voltage 22o is a three-times frequency waveform which falls over one period in phase with the turning-off phase of the switching current signals 1ai, 1bi, and 1ci.

The three-times frequency waveform superimposed on the control voltage 22o is in sync with the turning on of the switching current signals 1ai, 1bi, and 1ci, starts falling at the turning on of the individual switching current signals 1ai, 1bi, and 1ci, ends falling, and then, is reset respectively at the phase of the turning on of the switching current signals 1bi, 1ci, and 1ai in the other DC—DC converters 1b, 1c, and 1a in the first embodiment as shown in FIG. 5. At this phase, the control voltage 22o is at the minimum electric potential. As a result, a pulse phase determined by the electronic potential change in one period of the three-times frequency waveform and the rising slope of the switching current signal is a lower limit of the pulse width which does not generate the malfunction. Thus, the pulse lower limit phase sets the control range, and the malfunction occurs when the change range of the pulse width is large due to the wide range of the input voltage change or the pulse width is set to narrow due to a large input/output voltage ratio.

In the present embodiment, the three-times frequency waveform superimposed on the control voltage 22o ends falling and is reset at the turning off of the individual switching current signals 1ai, 1bi, and 1ci, and starts falling respectively at the phase of the turning off of the switching current signals 1ci, 1ai, and 1bi respectively in the other DC—DC converters 1c, 1a, and 1b. Thus, even when the pulse width changes, the phase of the end of the falling of the three-times frequency waveform, which coincides with the lowest electric potential of the control voltage 22o, always determines the output pulses 21ao, 21bo, and 21co. The phase of the noise and ripple superimposed by the turning on of the switching current signals 1bi, 1ci, and 1ai of the other DC—DC converters 1b, 1c, and 1a moves toward the phase of the end of falling on the falling slope of the three-times frequency waveform as the pulse width decreases. Thus, the lower limit of the pulse width which does not generate the malfunction in the present embodiment is determined by a phase where the superimposed noise and ripple are close the phase of end of the falling, and their lowest electric potential crosses the rising slope of the switching current signals 1ai, 1bi, and 1ci, as indicated by broken lines in FIG. 5. The lower limit of the pulse width which does not generate the malfunction decreases as the slope of the three-times frequency waveform and the rising slope of the switching current signals 1ai, 1bi, and 1ci become steeper with respect to the magnitude of the superimposed noise and ripple. It is clear that the pulse width will increase up to ⅓ of the oscillation period however wide the pulse width may increase. In this way, it is possible to further increase the range of the pulse width which does not generate the malfunction compared with the first embodiment.

Thus, the switching power supply of the present embodiment does not generate the decrease of the pulse width as the conventional example in FIG. 34 does even when the change range of the pulse width is large due to a wide input range or the like in the current mode control with the interleave constitution. Consequently, it is possible to constitute an interleave type switching power supply which does not generate an irregular ripple fluctuation of the output voltage or current, and noise from the inductor components in the DC—DC converters.

(Third Embodiment)

Figure 7:
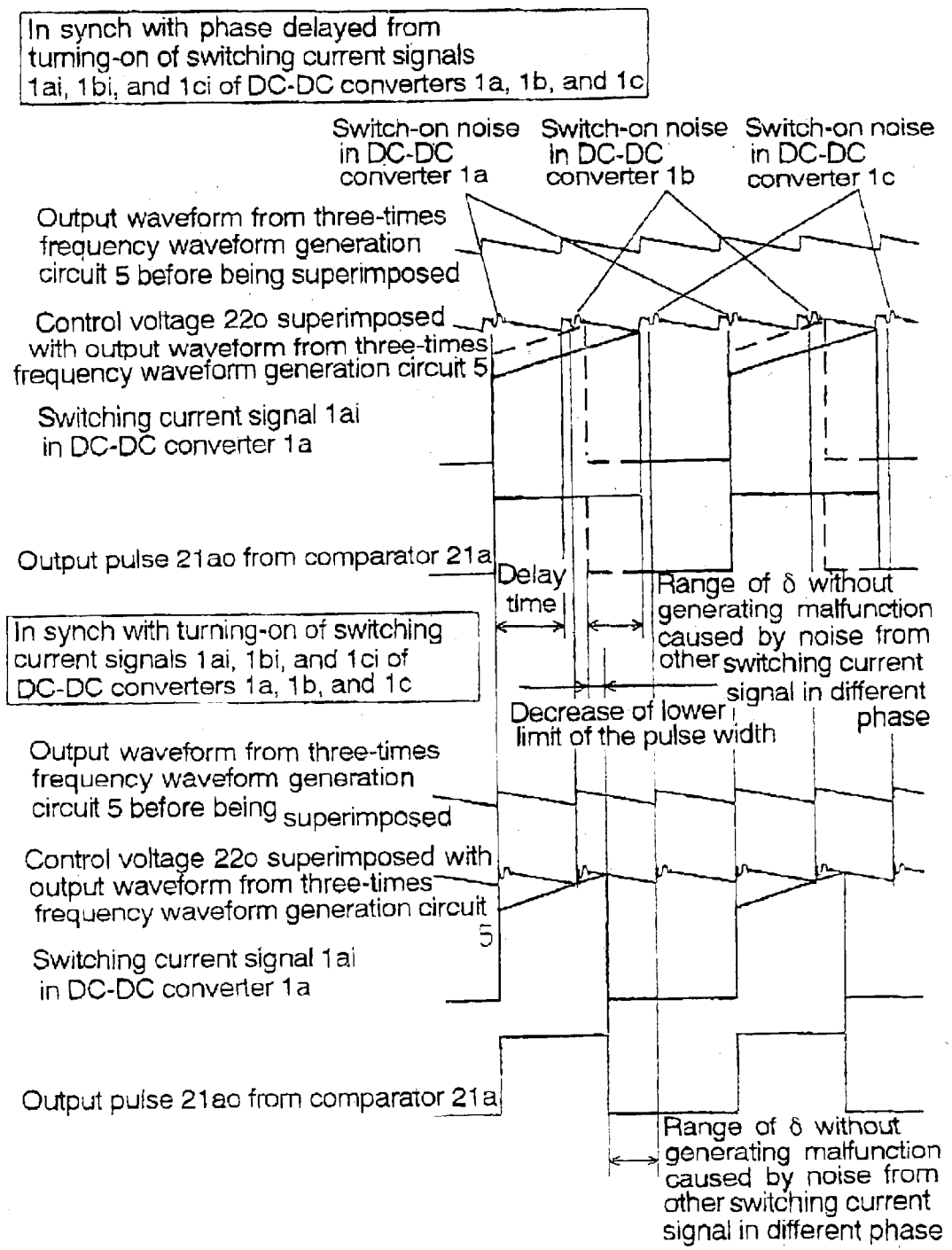
FIG. 7 is an explanatory diagram showing a comparison of a relationship among the control voltage, the switching current signal and the output pulse from the comparator in the switching power supply of a third embodiment with that of the first embodiment.
Figure 8A:
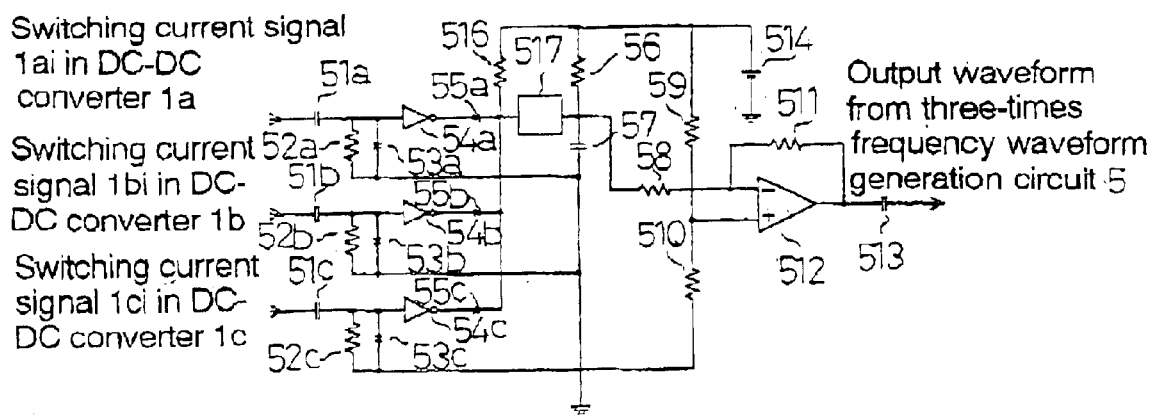
FIGS. 8A and 8B show an example of a specific constitution of a three-times frequency waveform generation circuit in the switching power supply of the third embodiment.
Figure 8B:
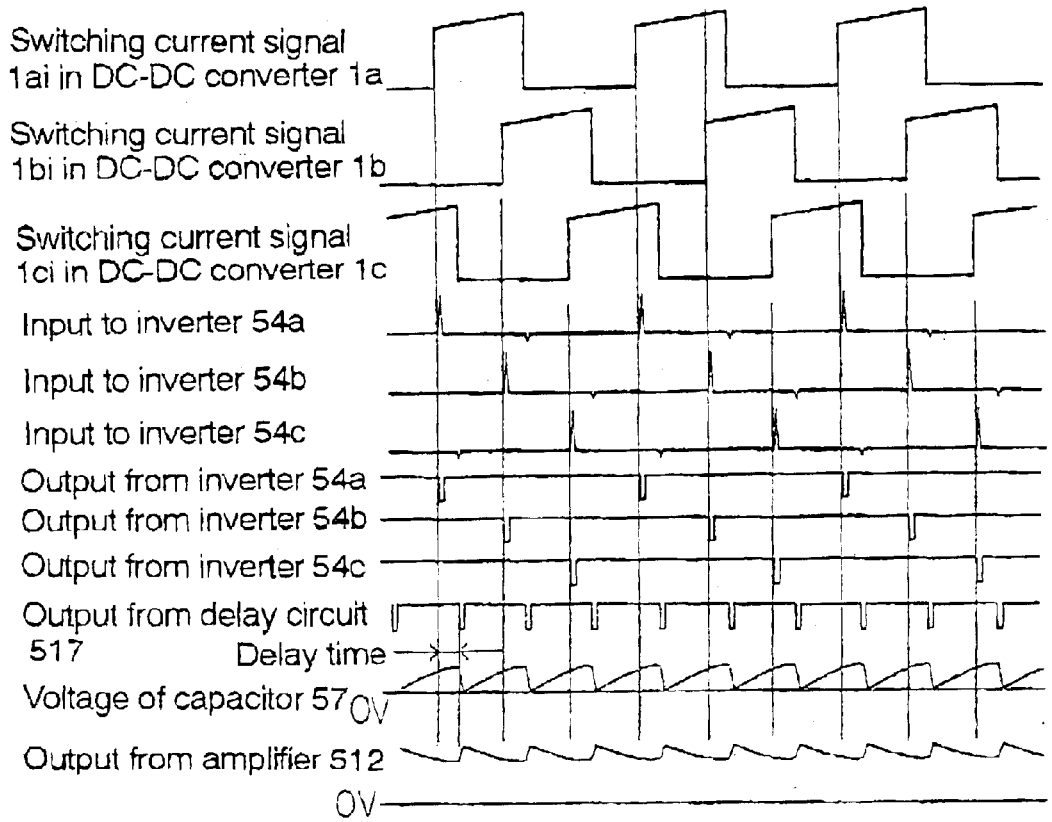

The following section describes a switching power supply of a third embodiment of the present invention while referring to FIG. 7 to FIG. 8B. A block diagram for the present embodiment is identical to the block diagram (FIG. 1) of the first embodiment. The present embodiment is different from the switching power supply of the first embodiment only in that the output 5o of the three-times frequency waveform generation circuit 5 is in phase with a phase delayed by a certain period from the turning-on phase of the switching current signal or a signal in phase with this signal (referred to as switching current signal or the like hereafter). Since all the other parts have constitutions and functions identical to those in the first embodiment, the same reference numerals are assigned to these parts, descriptions therefor are not provided, and description is provided only for the point that the output 5o of the three-times frequency waveform generation circuit 5 is in phase with the phase delayed by a certain period from the turning-on phase of the switching current signal or the like.

FIG. 7 shows a comparison of a relationship between the control voltage 22o and the switching current signal 1ai in the first embodiment with those in the present embodiment. FIG. 8A shows a specific constitution example of the three-times frequency generation circuit 5 whose output 5o is in phase with the phase delayed by a certain period from the turning-on phase of the switching current signals or the like, and FIG. 8B shows waveforms at individual points.

The example of a specific constitution of the three-times frequency waveform generation circuit 5 in FIG. 8A is different from that of the first embodiment only in adding a delay circuit 517 and a resistor 516 between the diode 55a, 55b, and 55c and the capacitor 57 of the specific constitution example in FIG. 3A so as to make the output 5o in phase with the phase delayed by a certain period from the turning-on phase of the switching current signals or the like. The capacitor 57 starts being charged by the operation of the added delay circuit 517 and resistor 516 as shown in FIG. 8B in phase with the phase delayed by a certain period from the individual rise of the switching current signals 1ai, 1bi, and 1ci, and thus generates a corresponding three-times frequency waveform. Consequently the output 5o superimposed on the control voltage 22o is a three-times frequency waveform which falls over one period, and is in phase with the phase delayed by a certain period from the turning-on phase of the switching current signals 1ai, 1bi, and 1ci. As in the description for the second embodiment, the pulse lower limit phase sets the control range, and causes the malfunction due to the lower limit of the pulse width which results from making the output 5o in phase with the turning-on phase, and is set so as not to generate the malfunction when the change range of the pulse width is large or the pulse width is set to narrow due to a large input/output voltage ratio in the first embodiment. As broken lines in FIG. 7 show, since the fall of the three-times frequency waveform starts at the phase delayed from the turning-on phase in the present embodiment, the lower limit of the pulse width restricted by the minimum electronic potential of the three-times frequency waveform at the turning-on phase is changed to be restricted by the lowest electric potential of the noises and the ripples superimposed on the control voltage 22o due to the turn-on of the switching current signals 1bi, 1ci, and 1ai of the other DC—DC converters 1b, 1c, and 1a. Consequently, the lower limit of the pulse width decreases.

Thus, the switching power supply of the present embodiment does not generate the decrease of the pulse width as the conventional example in FIG. 34 does even when the pulse width is set to narrow due to a large input/output voltage ratio in the current mode control with the interleave constitution. Consequently, it is possible to constitute an interleave type switching power supply which does not generate an irregular ripple fluctuation of the output voltage or current, and noise from the inductor components in the DC—DC converters.

(Fourth Embodiment)

Figure 9:
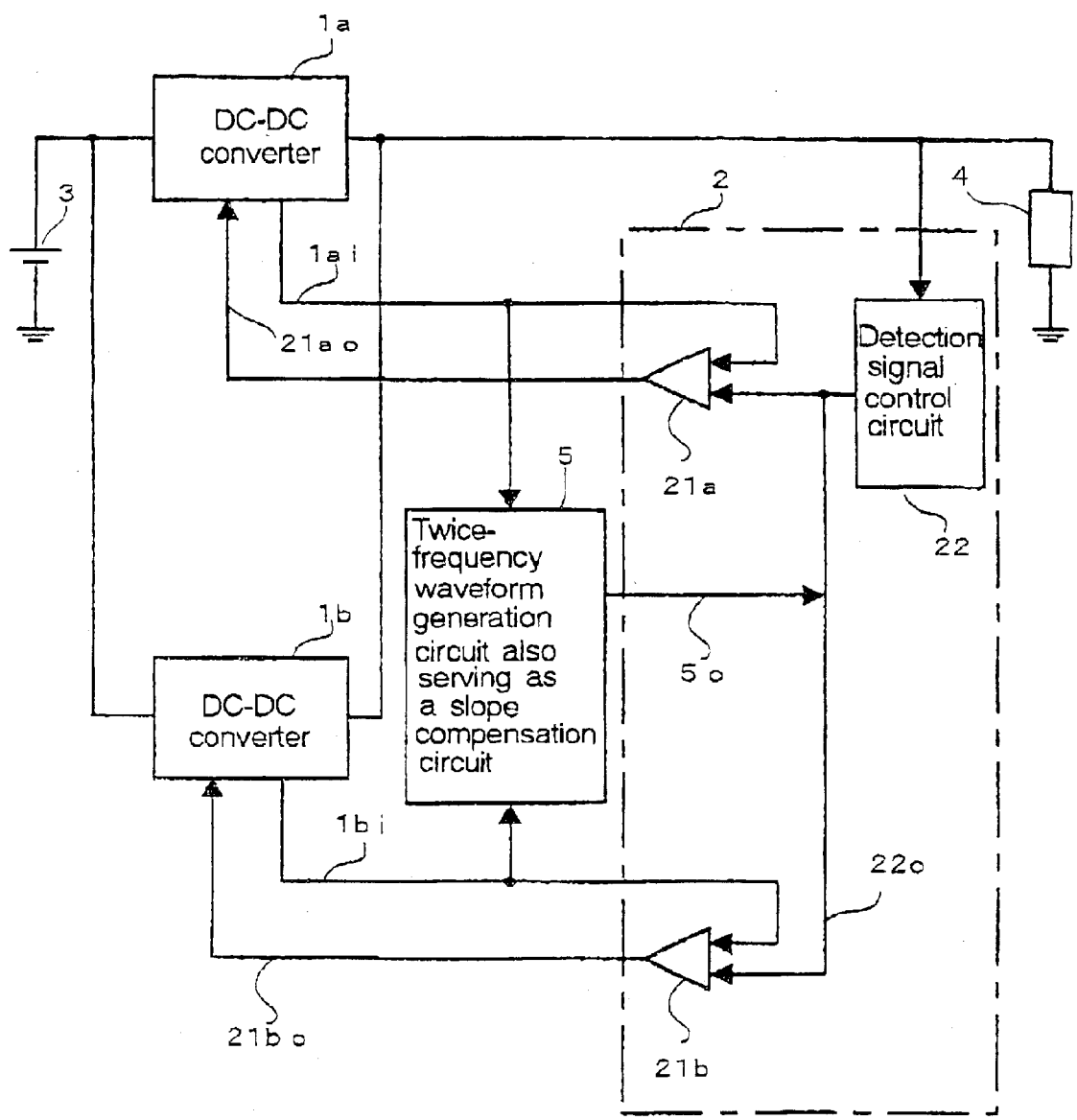
FIG. 9 is a block diagram of a switching power supply of a fourth embodiment of the present invention.

The following section describes a switching power supply of a fourth embodiment of the present invention while referring to FIG. 9 to FIG. 15B. FIG. 9 shows a block diagram of the switching power supply of the present embodiment. The switching power supply of the present embodiment includes the current mode control circuit 2 for comparing a switching current signal or a signal proportional to this signal with a control voltage so as to control the switching current pulse, the DC—DC converters 1a and 1b connected in parallel, and controlled by the current mode control circuit 2, and a twice-frequency waveform generation circuit 5 for generating a waveform with a frequency two times of an oscillation frequency of the DC—DC converters in sync with this oscillation frequency, thereby superimposing it on the control voltage as shown in FIG. 9. The twice-frequency waveform generation circuit 5 also functions as a slope compensation circuit. The same reference numerals are assigned to the parts having constitutions and functions identical to those in the first embodiment, and descriptions therefor are not provided.

Figure 10A:
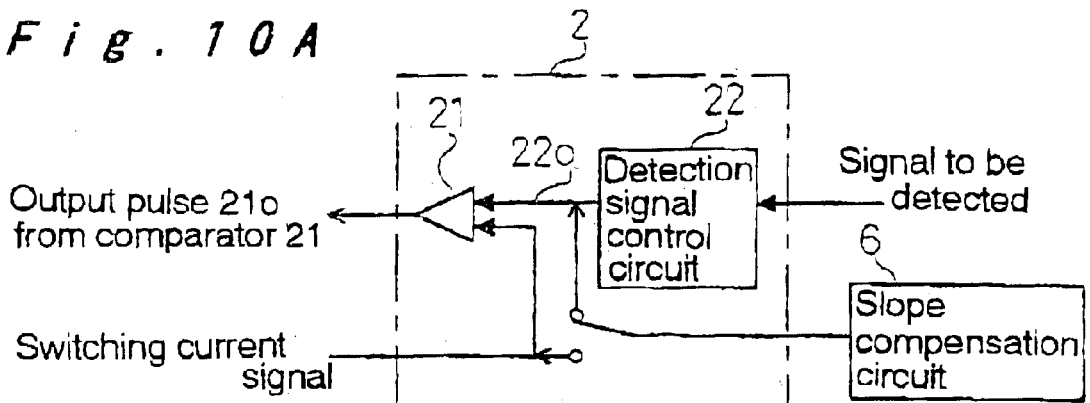
FIGS. 10A–10C show a general method for impressing a slope compensation on a conventional current mode control circuit.
Figure 10B:
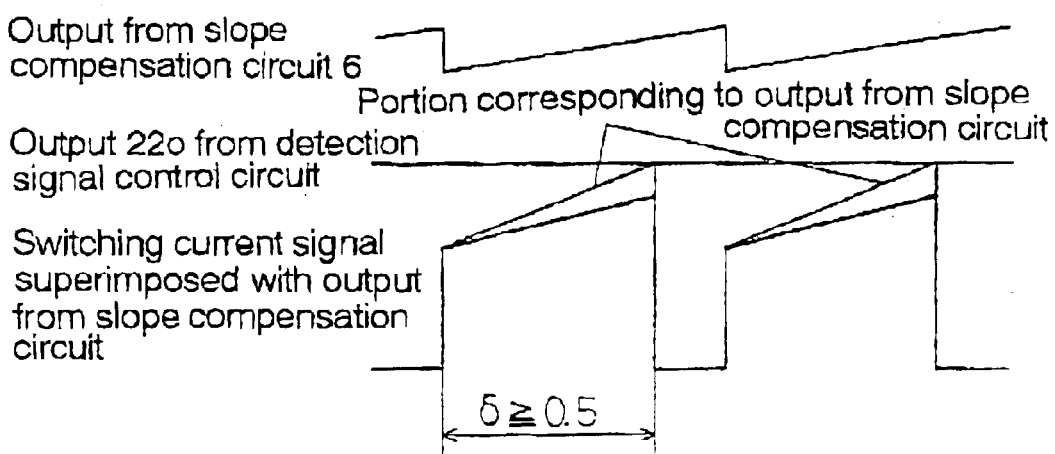
Figure 10C:
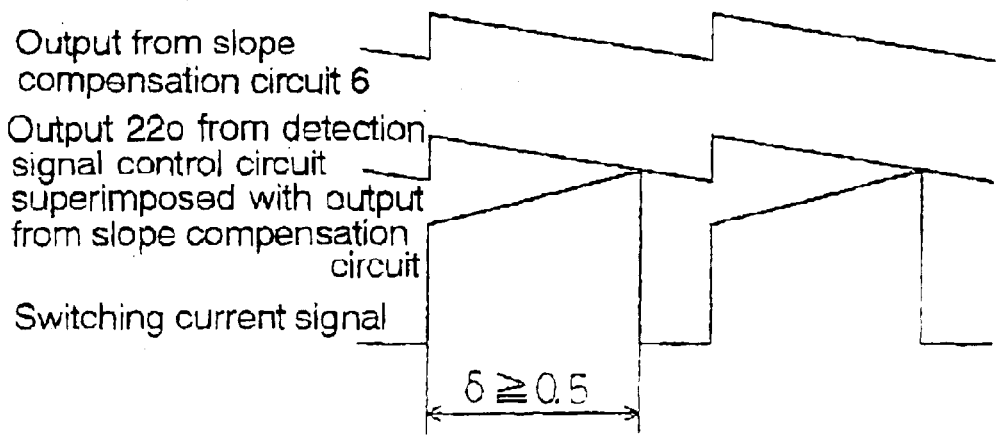

It is known that when a current flowing through a choke or a transformer is a continuous current, and the on-time ratio (δ) of the current is 0.5 or more in the current mode control, oscillation called as subharmonic oscillation is generated, and consequently, a measure called as slope compensation becomes necessary. FIG. 10A shows a general method for applying the slope compensation to the conventional current mode control circuit. The output from a slope compensation circuit 6 is impressed either on the output 22o from the detection signal control circuit 22 or the switching current signal which is input to the comparator 21. FIG. 10B shows waveforms when the output from the slope compensation circuit 6 is impressed on the switching current signal. The original switching current signal superimposed with the output from the slope compensation circuit 6 is compared with the output 22o from the detection signal control circuit. FIG. 10C shows waveforms when the output from the slope compensation circuit 6 is impressed on the output 22o from the detection signal control circuit. The output from the slope compensation circuit 6 increases as time elapses when the output is impressed on the switching current signal, and decreases as time elapses when the output is impressed on the output 220 from the detection signal control circuit.

Figure 11:
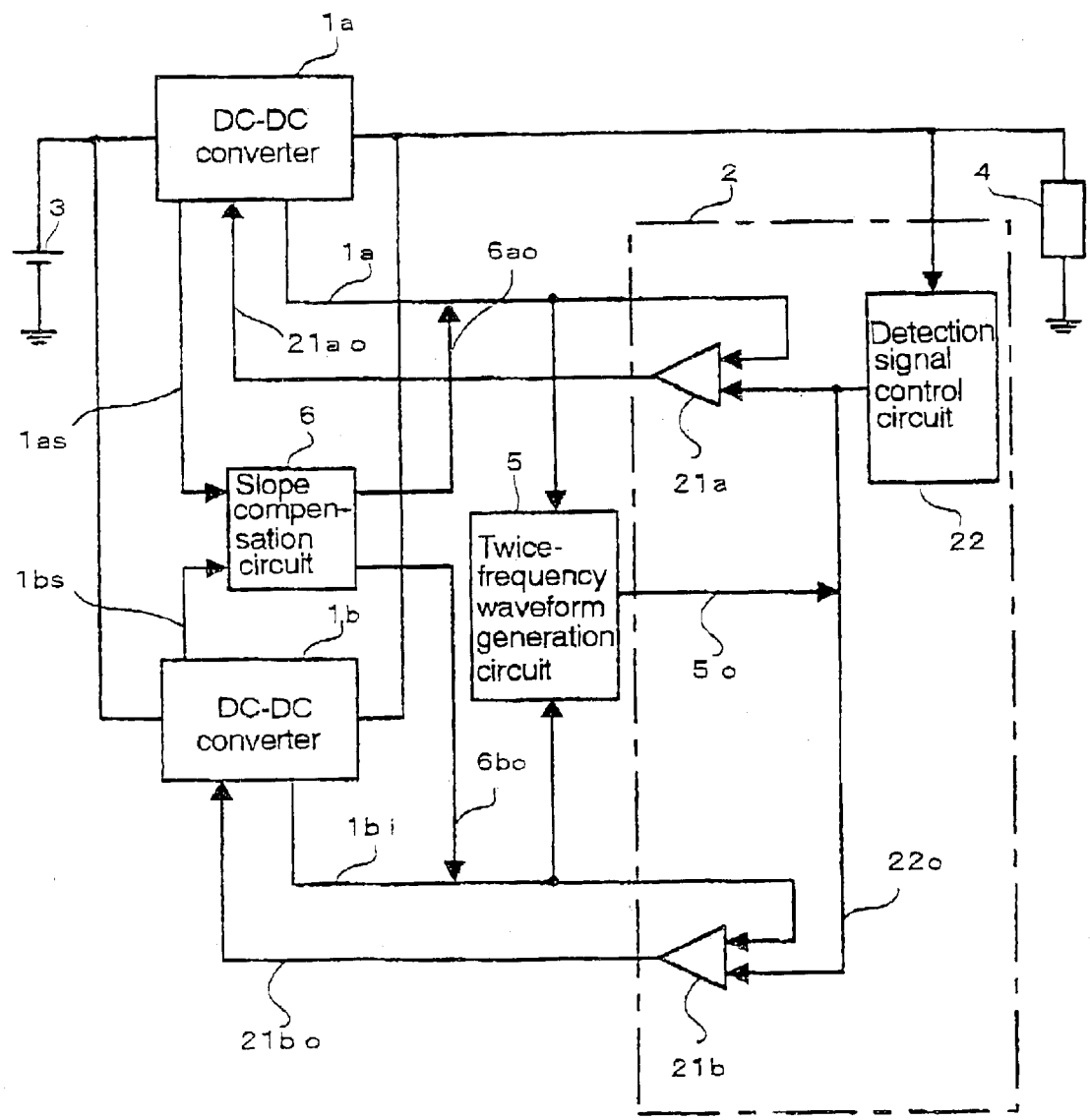
FIG. 11 is a block diagram where a slope compensation circuit is added to the switching power supply of the first embodiment of the present invention.

FIG. 11 is a block diagram for the first embodiment including the slope compensation circuit 6. Two DC—DC converters are connected in parallel. Since the output 22o from the detection signal control circuit is used to control the DC—DC converters 1a and 1b, it is not possible to impress the outputs from the slope compensation circuit 6 on the output 22o from the detection signal control circuit. Thus, the outputs 6ao and 6bo from the slope compensation circuit 6 are respectively impressed on the switching current signal 1ai and 1bi. The inputs to the slope compensation circuit 6 are oscillation frequency signals 1as and 1bs of the DC—DC converters 1a and 1b.

Figure 12:
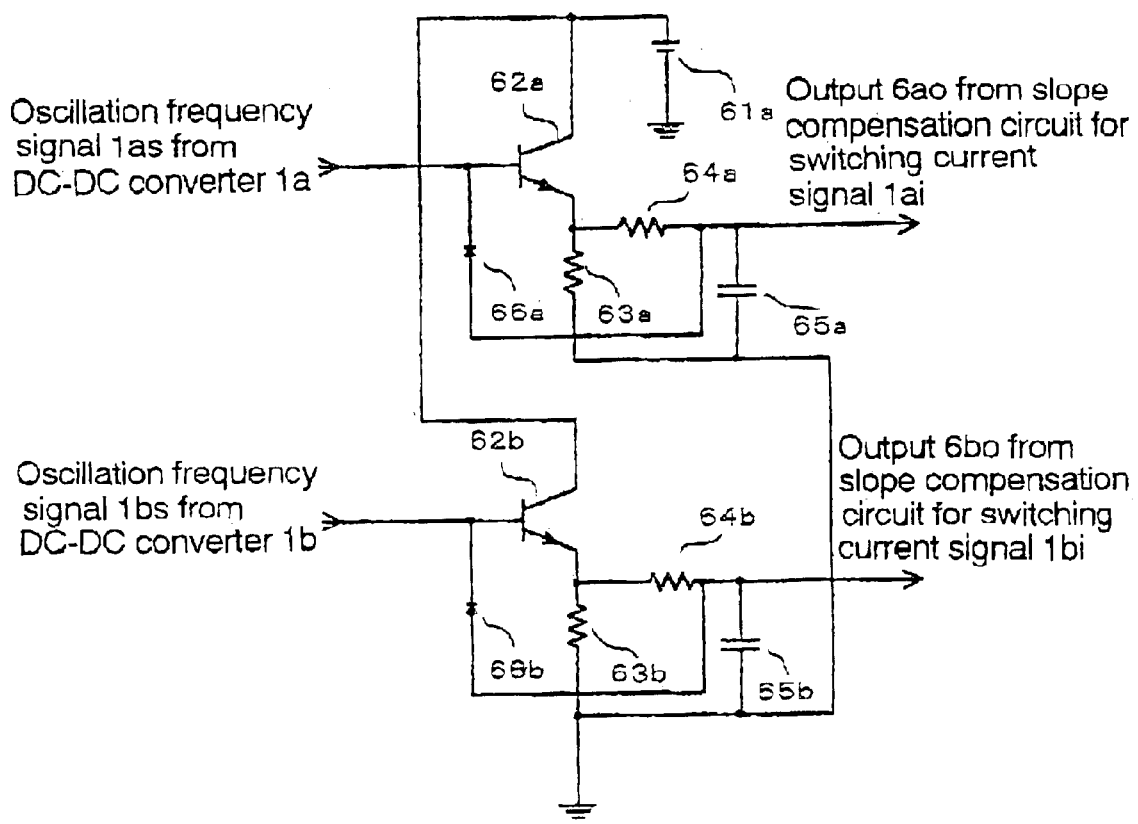
FIG. 12 is a circuit diagram showing an example of a specific constitution of the slope compensation circuit in FIG. 11.
Figure 13:
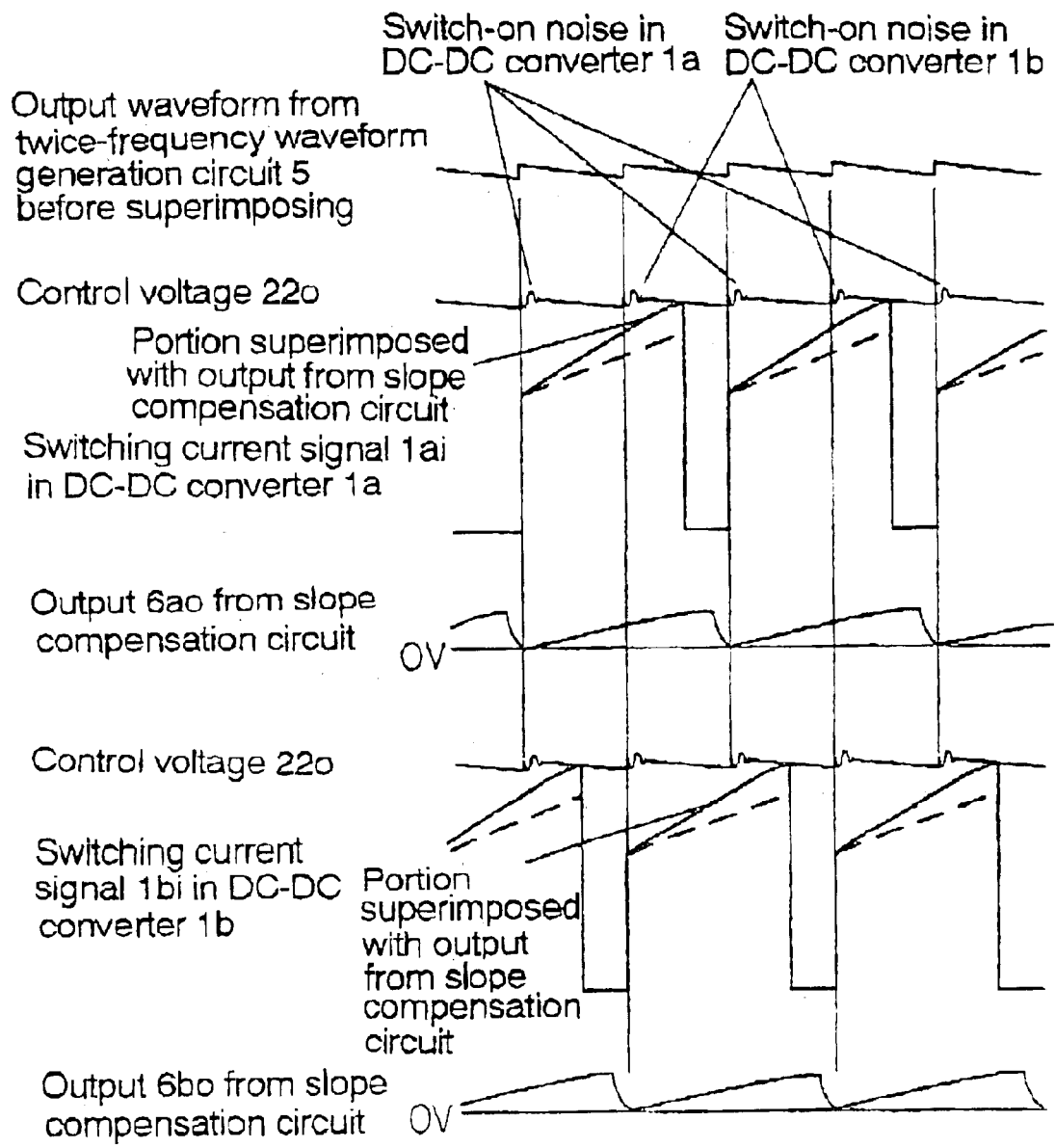
FIG. 13 is a waveform diagram of a control voltage, switching current signals, and outputs from the slope compensation circuit in FIG. 11.
Figure 14:
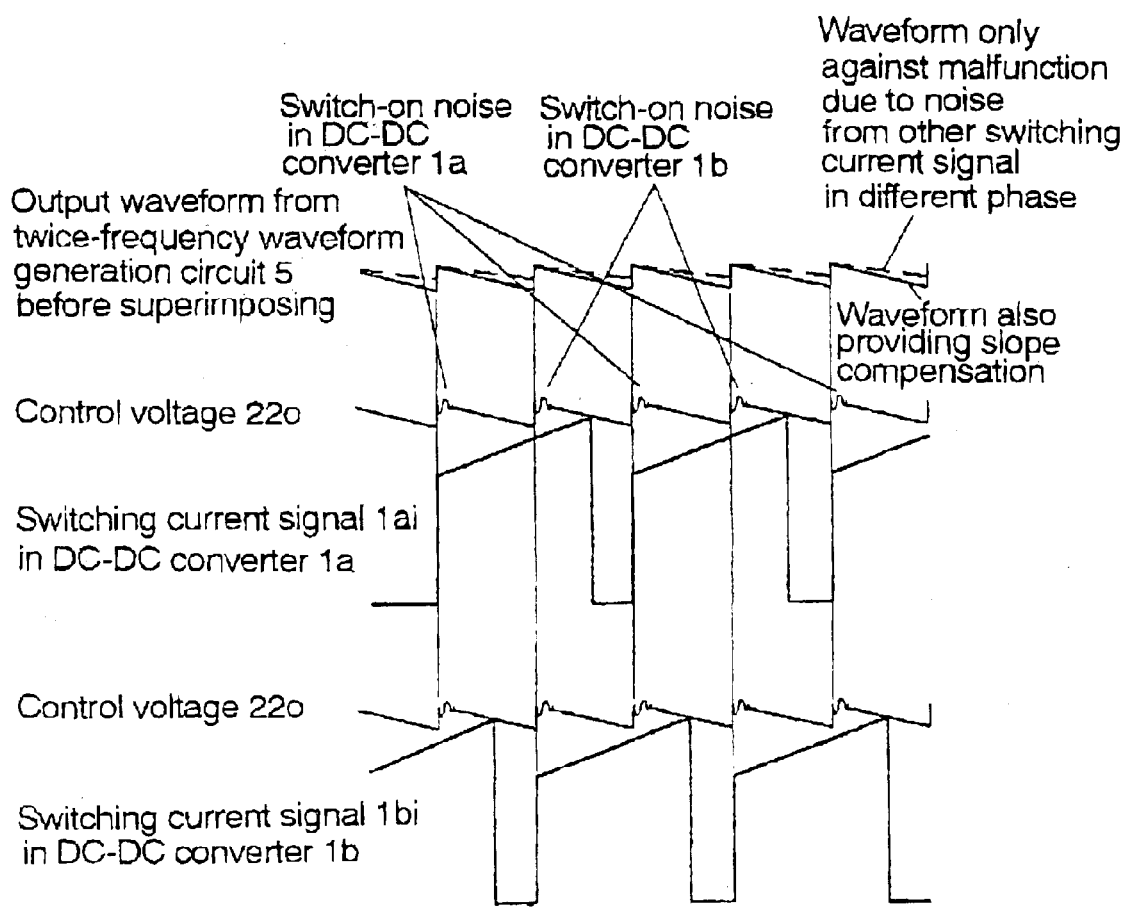
FIG. 14 is a waveform diagram of the switching power supply of the fourth embodiment.
Figure 15A:
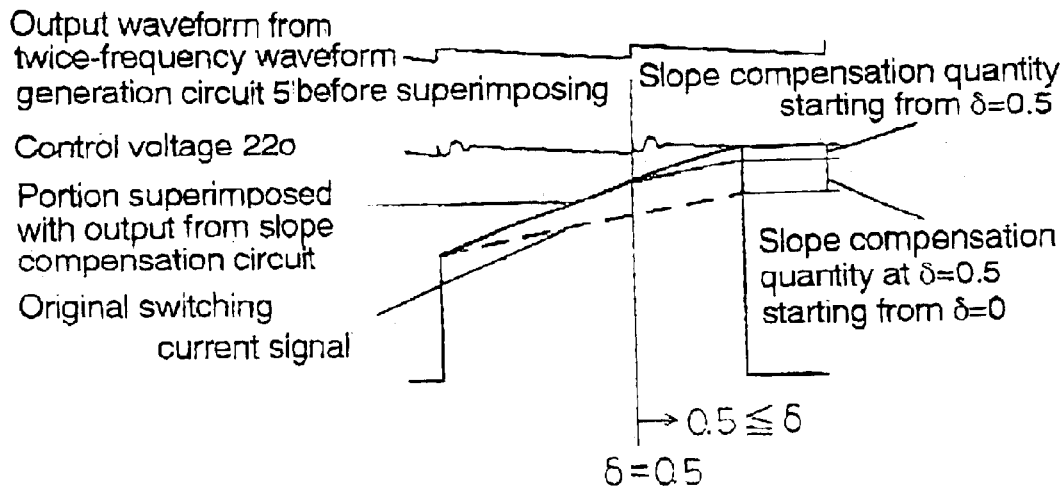
FIGS. 15A and 15B show slope compensation quantities in the first and the fourth embodiments of the present invention.
Figure 15B:
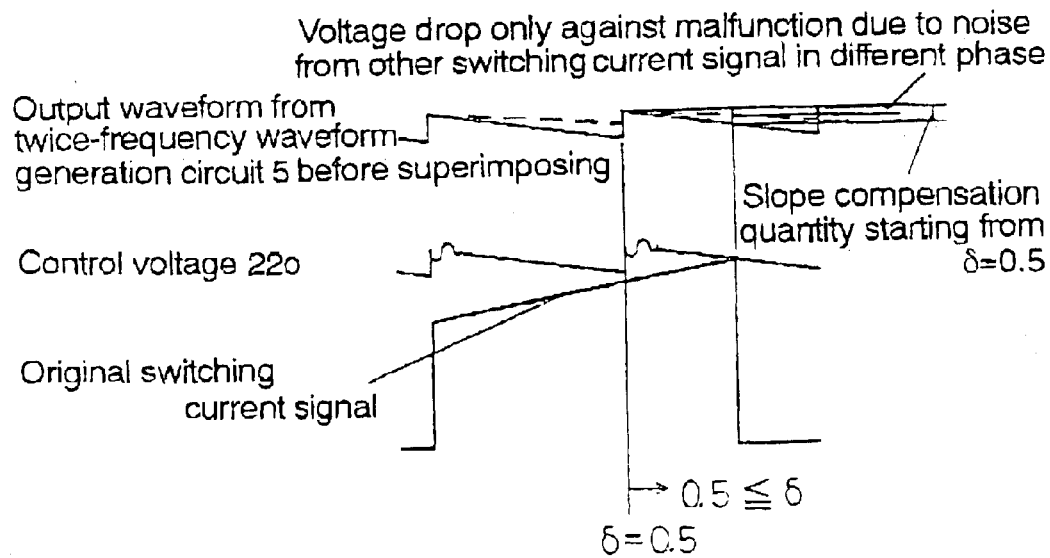

FIG. 12 shows an example of a specific constitution of the slope compensation circuit 6. The slope compensation circuit 6 includes a DC—DC power supply 61, switches 62a and 62b, resistors 63a, 63b, 64a, and 64b, capacitors 65a and 65b, and diodes 66a and 66b. FIG. 13 shows waveforms for the control voltage 22o, the switching current signals 1ai and 1bi, and the outputs 6ao and 6bo from the slope compensation circuit 6 shown in FIG. 11. As FIG. 13 shows, the switching current signals 1ai and 1bi are original switching current signals superimposed with the output from the slope compensation circuit. Also, the twice frequency waveform described in the first embodiment is superimposed on the control voltage 22o. Both of the superimposed voltages add a bias shifting up the original control electric potential, and increase as time elapses. In other words, the range of the control is decreased, and the decrease of the control range grows as time elapses. In the present embodiment, the output 5o of the twice-frequency waveform generation circuit 5 is used for the slope compensation so as to restrain the decrease of the control range. FIG. 14 shows the waveforms of the control voltage 22o and the switching current signals 1ai and 1bi in FIG. 9. FIG. 15A shows the slope compensation quantity in FIG. 11. FIG. 15B shows the slope compensation quantity in FIG. 9 of the present embodiment. The slope compensation waveform superimposed on the switching current signals 1ai and 1bi is generally impressed starting from the phase of turning on as shown in FIG. 15A. A condition required for the slope compensation is the slope angle of the impressed waveform. It is also said that a slope angle more than a half of the slope angle of an excitation reset current of the choke or the transformer is required. When the slope compensation waveform is impressed starting from the phase of the turning on, a large slope compensation voltage is already impressed at the point of on-time ratio (δ) of 0.5 where the slope compensation for restraining the subharmonic oscillation starts necessary as shown in FIG. 15A. Thus, this voltage is additionally impressed at the time of turning off compared with a case where the slope compensation waveform is impressed starting from the point of on-time ratio (δ) of 0.5, and consequently, the control range is decreased. In the present embodiment, the output $5o$ of the twice-frequency waveform generation circuit 5 is also used as the slope compensation. When the twice-frequency waveform generation circuit 5 is in phase with the turning-on phase, the slope compensation waveform starts falling from the point of the on-time ratio (δ) of 0.5, and is reset at the point of the on-time ratio (δ) of 1.0. The same slope compensation is applied to each of the switching current signals $1ai$ and $1bi$ since the twice frequency waveform is used. When a required slope compensation slope angle exceeds the slope angle for preventing the malfunction caused by the superimposed noise and ripple, the voltage representing the difference in the slope angle corresponds to a control range reduced only by the slope compensation. FIG. 15B shows this case. When the slope angle for preventing the malfunction caused by the superimposed noise and ripple exceeds the required slope compensation slope angle, there is no control range reduced only by the slope compensation.

Thus, the present embodiment not only provides an effect similar to that of the first embodiment, but also uses the output $5o$ of the twice-frequency waveform generation circuit 5 also for the slope compensation so as to largely restrain the decrease of the control range compared with the case where the slope compensation waveform is impressed on the individual switching current signals $1ai$ and $1bi$ in the first embodiment, thereby avoiding the decrease of the input/output range caused by the addition of the slope compensation and the like.

(Fifth Embodiment)

Figure 16:
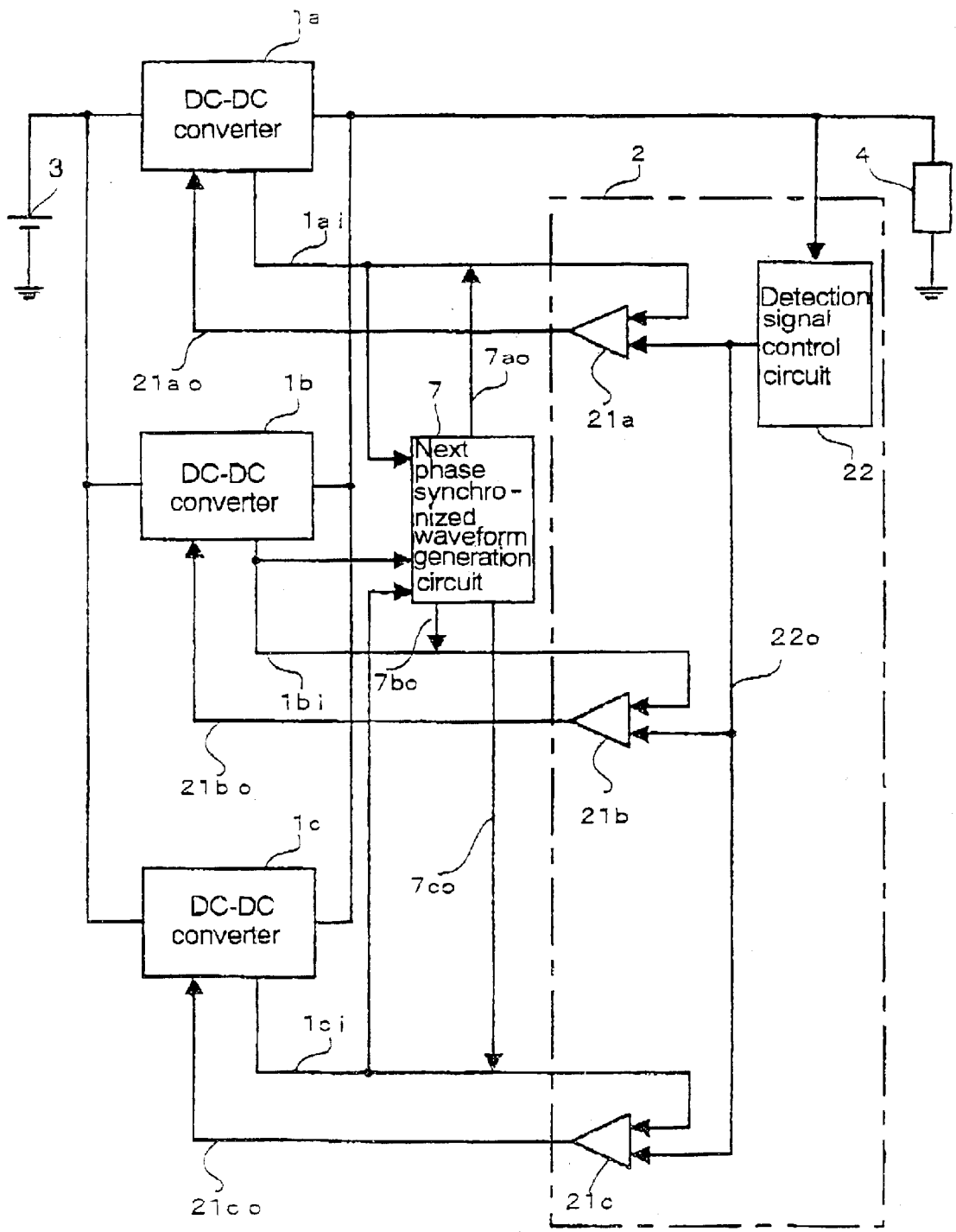
FIG. 16 is a block diagram of a switching power supply of a fifth embodiment of the present invention.

The following section describes a switching power supply of a fifth embodiment of the present invention while referring to FIG. 16 to FIG. 19. FIG. 16 shows a block diagram of the switching power supply of the present embodiment. As shown in FIG. 16, the switching power supply of the present embodiment includes the current mode control circuit 2, the DC—DC converters $1a$, $1b$, and $1c$, and a next phase synchronized waveform generation circuit 7. The current mode control circuit 2 compares a switching current signal or a signal proportional to this signal with a control voltage so as to control the switching current pulse. The DC—DC converters $1a$, $1b$, and $1c$ are connected in parallel, and controlled by the current mode control circuit 2. The next phase synchronized waveform generation circuit 7 generates waveforms respectively starting at the turning-on phase of the switching current signal $1bi$, $1ci$, and $1ai$ of the DC—DC converters $1b$, $1c$, and $1a$ or signals respectively in phase with them, and rising as time elapses, and superimposes the respective waveforms on the switching current signals $1ai$, $1bi$, and $1ci$ in the DC—DC converters $1a$, $1b$, and $1c$ or signals proportional to them. The same reference numerals are assigned to the parts having constitutions and functions identical to those in the first embodiment, and descriptions therefor are not provided.

Figure 17:
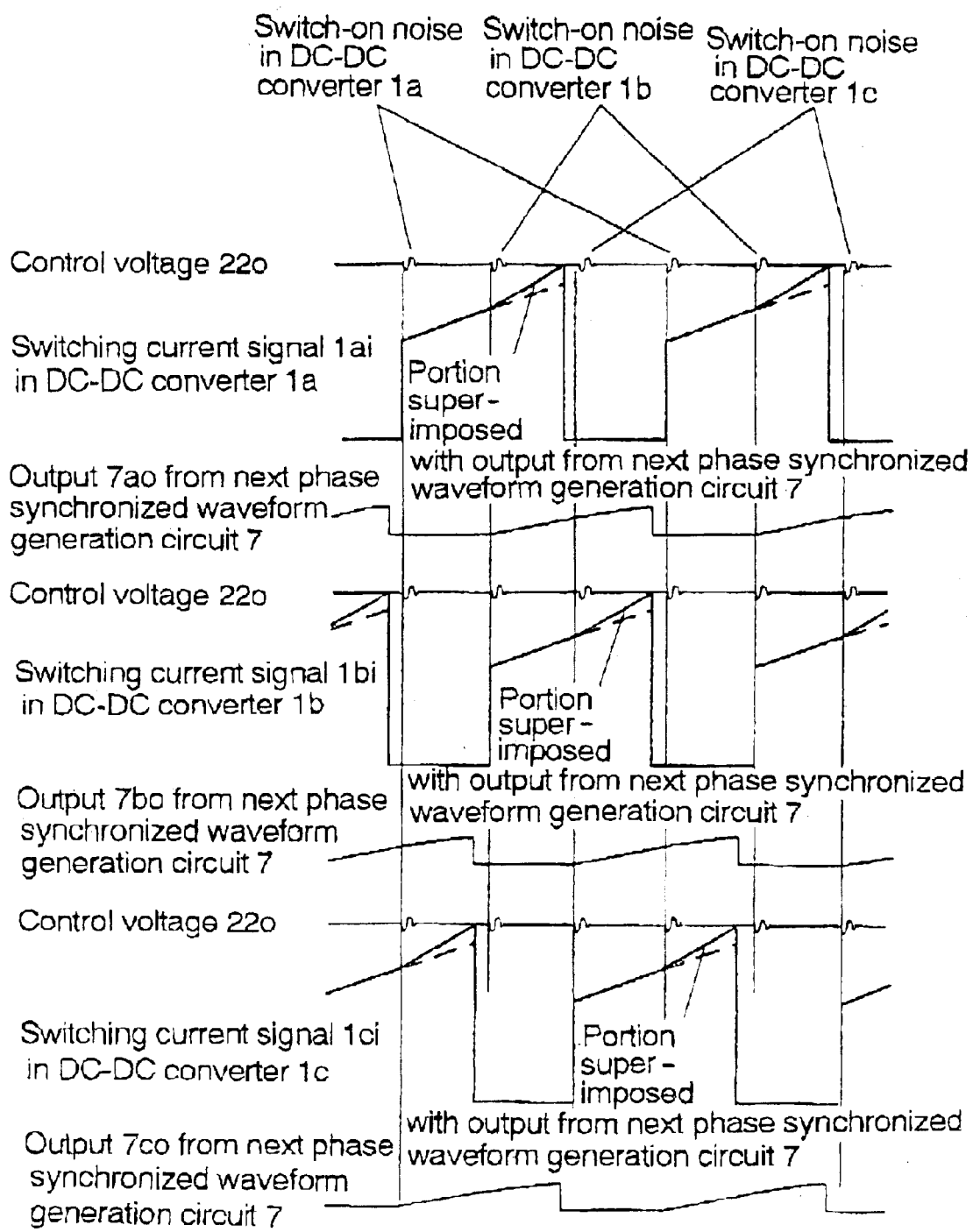
FIG. 17 is a waveform diagram of a control voltage, switching current signals, and outputs from the next phase synchronized waveform generation circuit in the fifth embodiment.
Figure 18A:
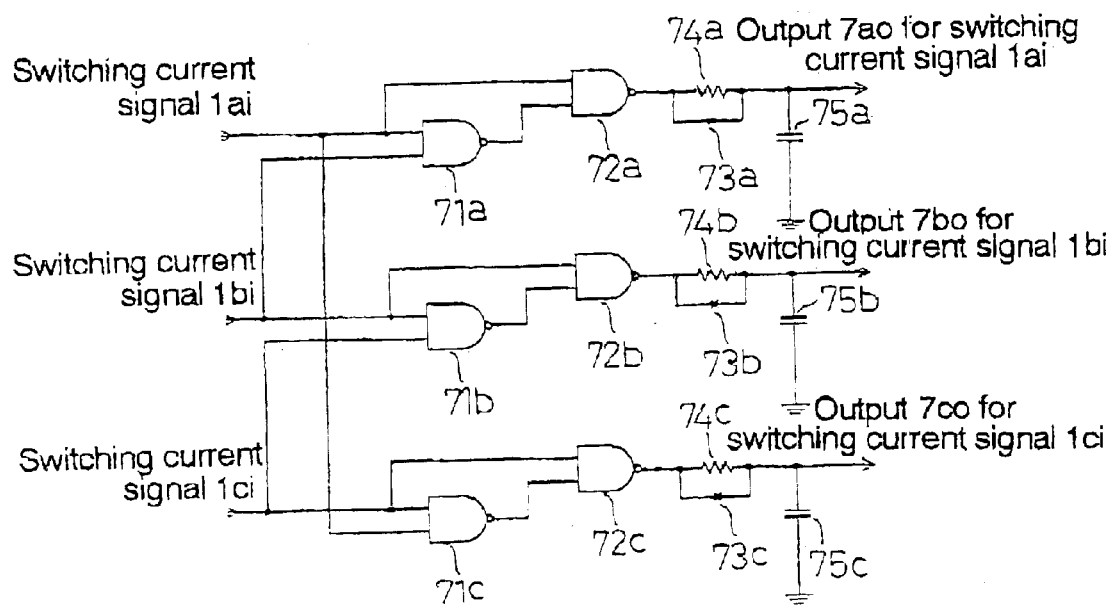
FIGS. 18A and 18B show an example of a specific constitution of the next phase synchronized waveform generation circuit in the fifth embodiment.
Figure 18B:
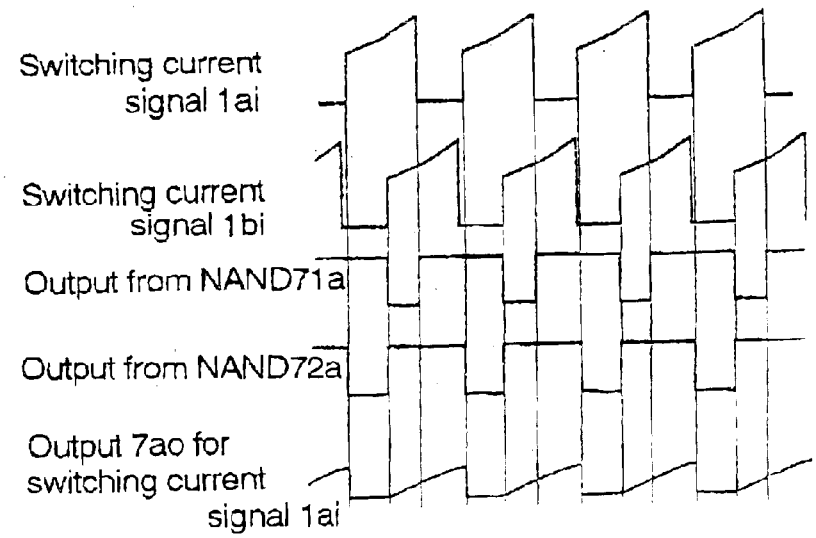
Figure 19:
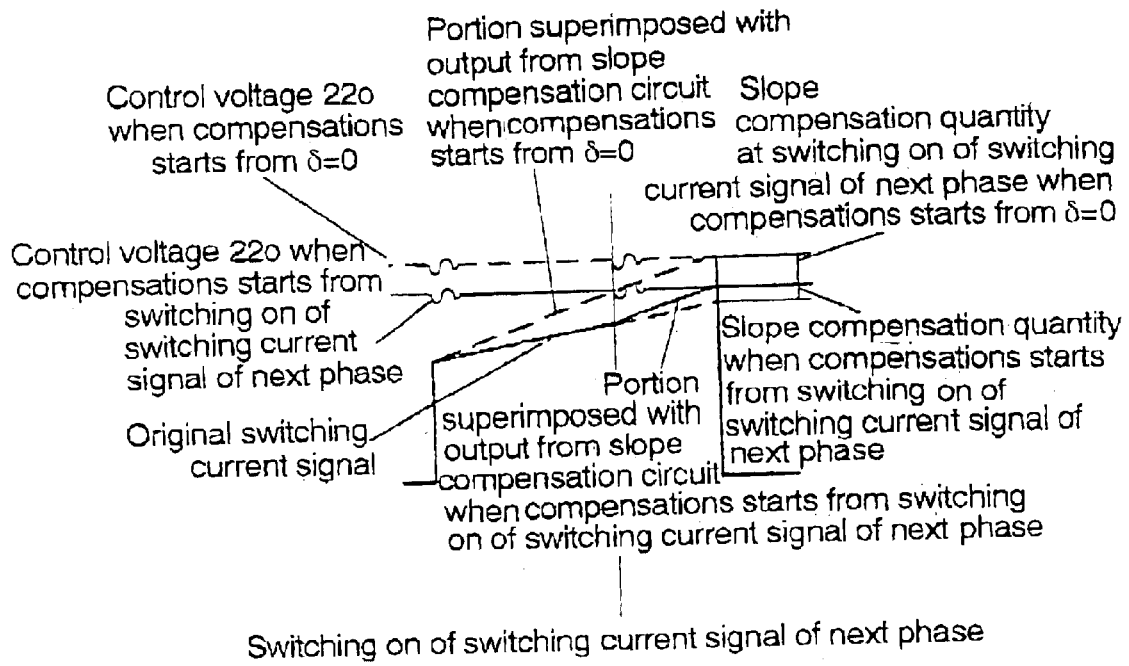
FIG. 19 is an explanatory diagram showing a slope compensation quantity in the fifth embodiment.

FIG. 17 shows waveforms of the control voltage $22o$, the switching current signals $1ai$, $1bi$, and $1ci$, and outputs $7ao$, $7bo$ and $7co$ from the next phase synchronized waveform generation circuit 7. FIG. 18A shows an example of a specific constitution of the next phase synchronized waveform generation circuit 7, and FIG. 18B shows waveforms of individual points in this circuit. FIG. 19 shows a slope compensation quantity in FIG. 16.

While the first to fourth embodiments use the three-times frequency waveform generation circuit 5 to superimpose the three-times frequency waveform in sync with the oscillation frequency of the DC—DC converters $1a$, $1b$, and $1c$ on the control voltage $22o$, the present embodiment uses the next phase synchronized waveform generation circuit 7 to superimpose respective waveforms, which start at the turning-on phase of the respective switching current signals $1bi$, $1ci$, and $1ai$ of the other respective DC—DC converters $1b$, $1c$, and $1a$, and increase as time elapses, on the switching current signals $1ai$, $1bi$, and $1ci$. This is the only difference between them. The next phase synchronized waveform generation circuit 7 receives the switching current signals $1ai$, $1bi$, and $1ci$, and provides waveforms $7ao$, $7bo$, and $7co$ which are in phase with the turning-on phase of the respective switching current signals $1bi$, $1ci$, and $1ai$ of the other respective DC—DC converters $1b$, $1c$, and $1a$, and increase as time elapses.

The following section briefly describes FIG. 18A which shows an example of the specific constitution of the next phase synchronized waveform generation circuit 7. NANDs $71a$ and $72a$, $71b$ and $72b$, and $71c$ and $72c$ respectively receiving the switching current signals $1ai$ and $1bi$, $1bi$ and $1ci$, and $1ci$ and $1ai$ generate positive pulses respectively in phase with the switching current signals $1bi$, $1ci$, and $1ai$. The individual resistors $74a$, $74b$, and $74c$, diodes $73a$, $73b$, and $73c$, and capacitors $75a$, $75b$, and $75c$ provide the waveforms which respectively start from the rise of the switching current signals $1b$, $1c$, and $1a$, and increase as time elapses. FIG. 18B shows the switching current signals $1ai$ and $1bi$, the outputs from the NANDs $71a$ and $72a$, and the output $7ao$ for the switching current signal $1ai$. FIG. 18A shows an example of the next phase synchronized waveform generation circuit 7, and this circuit can be constituted by various circuits, and is not limited to the present constitution.

In the present embodiment, the slope compensation quantity can be reduced at the moment when the next switching current signal turns on compared with the general case where the slope compensation waveform is impressed from the turning-on phase under the condition which requires the slope compensation as shown in FIG. 19. As a result, the control voltage $22o$ is reduced by a quantity corresponding to the reduced slope compensation quantity compared with the control voltage $22o$ of the case where the slope compensation waveform is impressed from the turning-on phase. In this way, it is possible to restrain the reduction of the control range largely. The present embodiment can also handle the reduction of the pulse width caused by the superimposed noise and ripple at the turning on of the switching current signal in the other DC—DC converter as in the first embodiment.

Thus, the present embodiment not only provides effect similar to that of the first embodiment, but also largely restrains the reduction of the control range compared with the first embodiment where the slope compensation waveform is impressed starting from the turning on of the switching current signal under the condition requiring the slope compensation. It is also possible to avoid the decrease of the input/output range caused by the addition of the slope compensation.

Thus, the switching power supply of the present embodiment constitutes an interleave type switching power supply which does not generate an irregular ripple fluctuation of the output voltage or current, and noise from the inductor components in the DC—DC converters, and presents a small decrease of the input/output range due to the addition of the slope compensation under the condition requiring the slope compensation.

(Sixth Embodiment)

Figure 20:
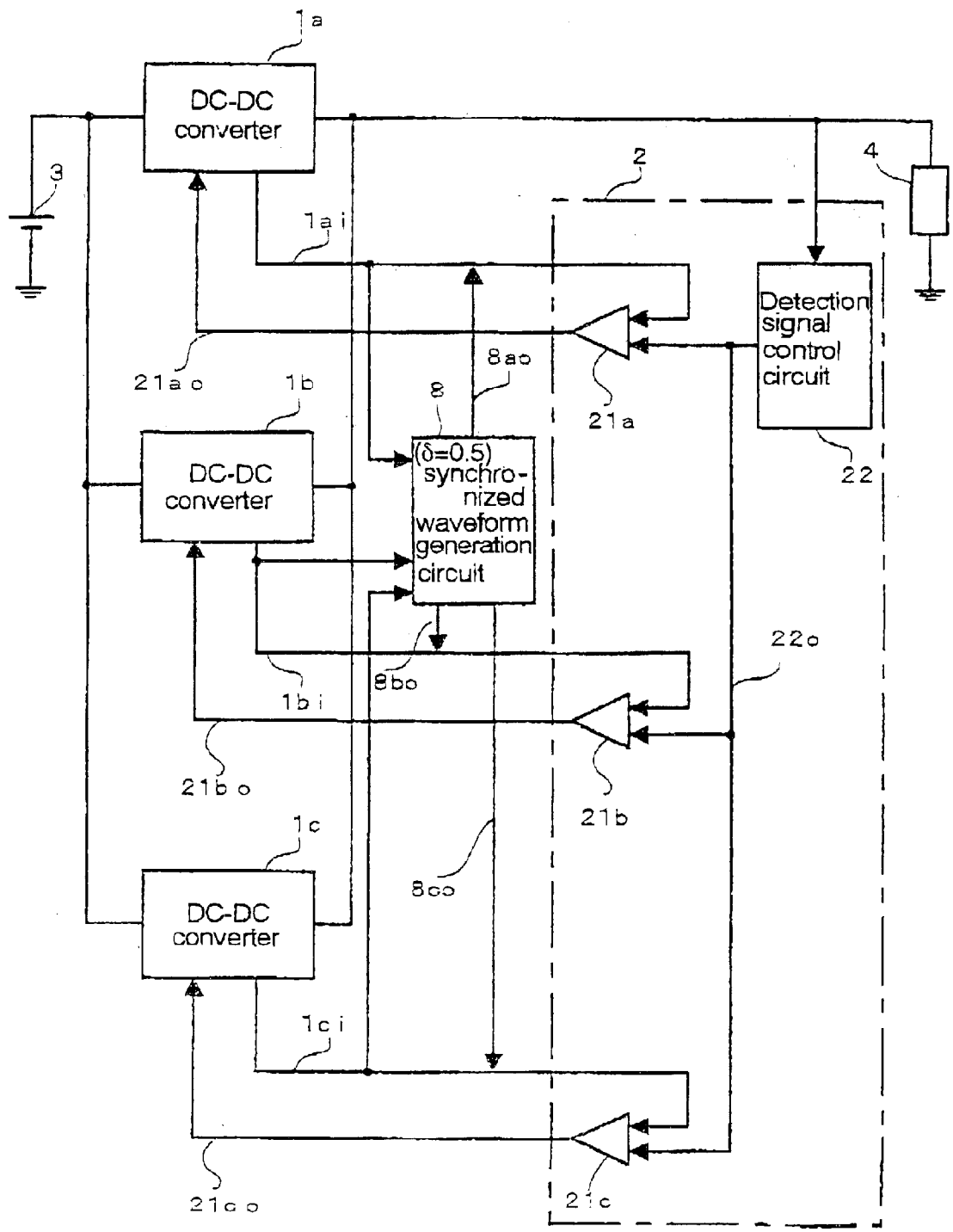
FIG. 20 is a block diagram of a switching power supply of a sixth embodiment of the present invention.

The following section describes a switching power supply of a sixth embodiment of the present invention while referring to FIG. 20 to FIG. 23. FIG. 20 shows a block diagram of the switching power supply of the present embodiment. As shown in FIG. 20, the switching power supply of the present embodiment comprises the current mode control circuit 2, the DC—DC converters 1a, 1b, and 1c, and a ($\delta$=0.5) synchronized waveform generation circuit 8. The current mode control circuit 2 compares a switching current signal or a signal proportional to the switching current signal with a control voltage so as to control the switching current pulse. The DC—DC converters 1a, 1b, and 1c are connected in parallel, and controlled by the current mode control circuit 2. The ($\delta$=0.5) synchronized waveform generation circuit 8 generates waveforms starting from the point of on-time ratio ($\delta$) of 0.5 of the respective switching current signals 1ai, 1bi, and 1ci of the DC—DC converters 1a, 1b, and 1c or signals respectively in phase with them, and rising as time elapses, and superimposes the respective waveforms on the switching current signals 1ai, 1bi, and 1ci in the DC—DC converters 1a, 1b, and 1c or signals proportional to them.

Figure 21:
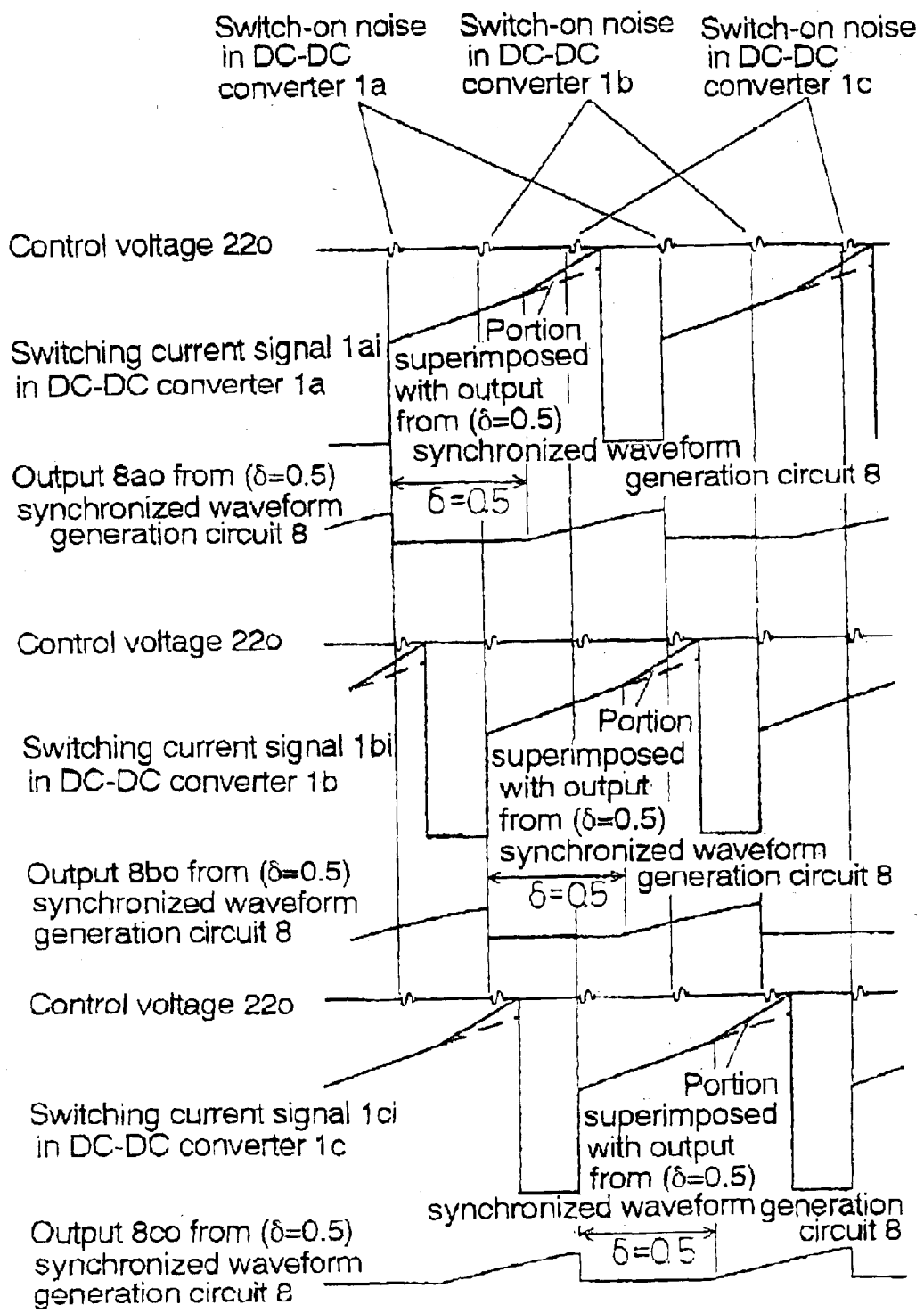
FIG. 21 is a waveform diagram for a control voltage, switching current signals, and outputs from a ($\delta$=0.5) synchronized waveform generation circuit of the sixth embodiment.
Figure 22A:
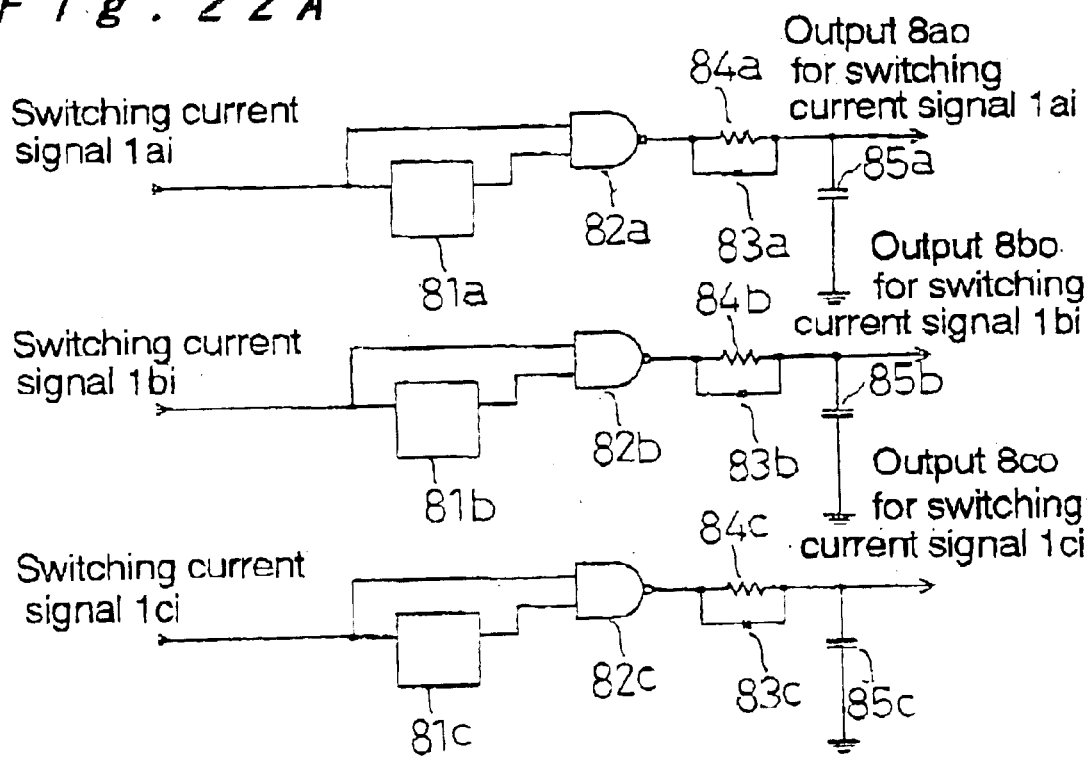
FIGS. 22A and 22B show an example of a specific constitution of the ($\delta$=0.5) synchronized waveform generation circuit.
Figure 22B:
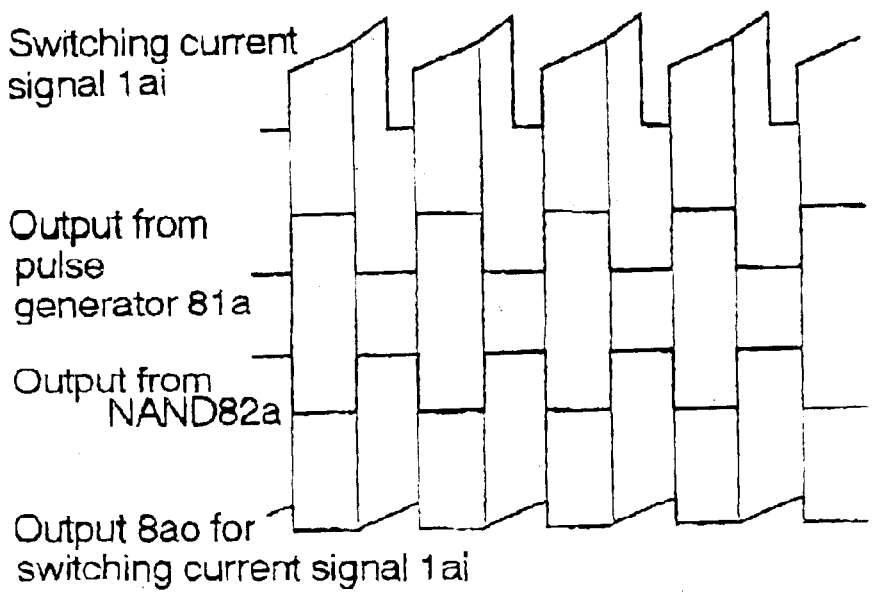
Figure 23:
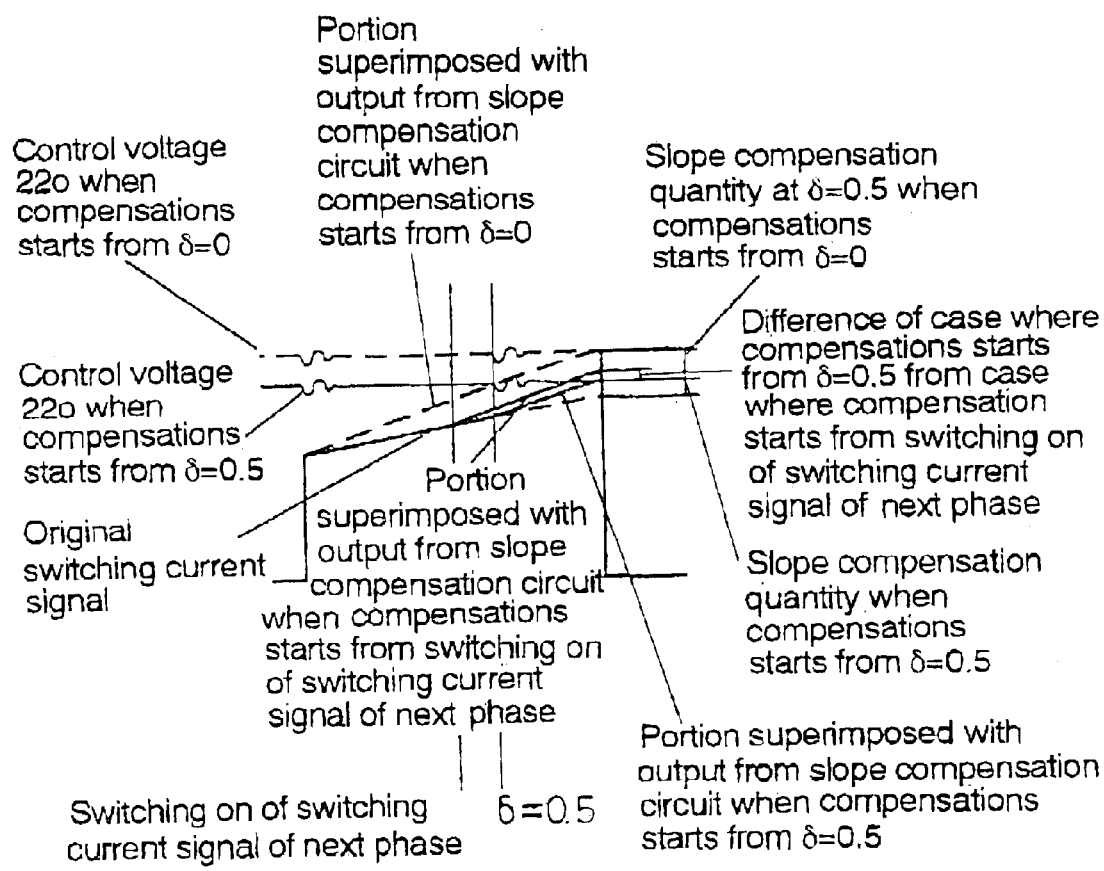
FIG. 23 is an explanatory diagram showing a slope compensation quantity of the sixth embodiment.

The same reference numerals are assigned to the parts having constitutions and functions identical to those of the switching power supply in the fifth embodiment, and descriptions therefor are not provided. FIG. 21 shows waveforms of the control voltage 22o, the switching current signals 1ai, 1bi, and 1ci, and outputs 8ao, 8bo and 8co from the ($\delta$=0.5) synchronized waveform generation circuit 8. FIG. 22A shows an example of a specific constitution of the ($\delta$=0.5) synchronized waveform generation circuit 8, and FIG. 22B shows waveforms of individual points in this circuit. FIG. 23 shows a slope compensation quantity in FIG. 20.

While the fifth embodiment uses the next phase synchronized waveform generation circuit 7 to superimpose the respective waveforms, which start at the turning on of the respective switching current signals 1bi, 1ci, and 1ai of the other respective DC—DC converters 1b, 1c, and 1a, and rise as time elapses, on the switching current signals 1ai, 1bi, and 1ci, the present embodiment uses the ($\delta$=0.5) synchronized waveform generation circuit 8 to generate the waveforms, which start from the point of on-time ratio ($\delta$) of 0.5 of the respective switching current signals 1ai, 1bi, and 1ci or signals respectively in phase with them, and rise as time elapses, and superimpose the waveforms on the switching current signals 1ai, 1bi, and 1ci. This is the only difference between them. The ($\delta$=0.5) synchronized waveform generation circuit 8 receives the switching current signals 1ai, 1bi, and 1ci, and provides waveforms 8ao, 8bo, and 8co which start from the point of on-time ratio ($\delta$) of 0.5 of the respective switching current signals 1ai, 1bi, and 1ci or signals respectively in phase with them, and rise as time elapses.

The following section briefly describes FIG. 22A which shows an example of the specific constitution of the ($\delta$=0.5) synchronized waveform generation circuit 8. Pulse generators 81a, 81b, and 81c respectively receiving the switching current signals 1ai, 1bi and 1ci, and NANDS 82a, 82b, and 82c generate positive pulses respectively delayed by the on-time ratio ($\delta$) of 0.5 from the turning-on phase of the switching current signals 1ai, 1bi, and 1ci. The individual resistors 84a, 84b, and 84c, diodes 83a, 83b, and 83c, and capacitors 85a, 85b, and 85c provide the waveforms which respectively start from the point of on-time ratio ($\delta$) of 0.5 from the turning-on phase of the switching current signals 1ai, 1bi, and 1ci, and increase as time elapses. FIG. 22B shows the switching current signal 1ai, the outputs from the pulse generator 81a and the NAND 82a, and the output 8ao as the switching current signal 1ai. FIG. 22A shows an example of the ($\delta$=0.5) synchronized waveform generation circuit 8, and this circuit can be constituted by various circuits, and is not limited to this constitution.

In the present embodiment, it is possible to reduce the slope compensation quantity at the moment of $\delta$=0.5 compared with the general case where the slope compensation waveform is impressed from the turning-on phase under the condition which requires the slope compensation as shown in FIG. 23. Also the slope compensation quantity can be reduced further compared with the case where the compensation starts from the following turning-on phase of the switching current signal of the other DC—DC converter as in the fifth embodiment. As a result, the control voltage 22o is reduced by a quantity corresponding to the reduced slope compensation quantity compared with the control voltage 22o of the case where the slope compensation waveform is impressed from the turning-on phase. In this way, the reduction of the control range is largely restrained. The present embodiment can also handle the reduction of the pulse width caused by the superimposed noise and ripple at the turning on of the switching current signal in the other DC—DC converter as in the first embodiment.

Thus, the present embodiment not only provides effect similar to that of the first embodiment, but also largely restrains the reduction of the control range compared with the fifth embodiment under the condition requiring the slope compensation. It is also possible to avoid the decrease of the input/output range caused by the addition of the slope compensation.

Thus, the switching power supply of the present embodiment constitutes an interleave type switching power supply which does not generate an irregular ripple fluctuation of the output voltage or current, and noise from the inductor components in the DC—DC converters, and presents a small decrease of the input/output range due to the addition of the slope compensation under the condition requiring the slope compensation.

(Seventh Embodiment)

Figure 24:
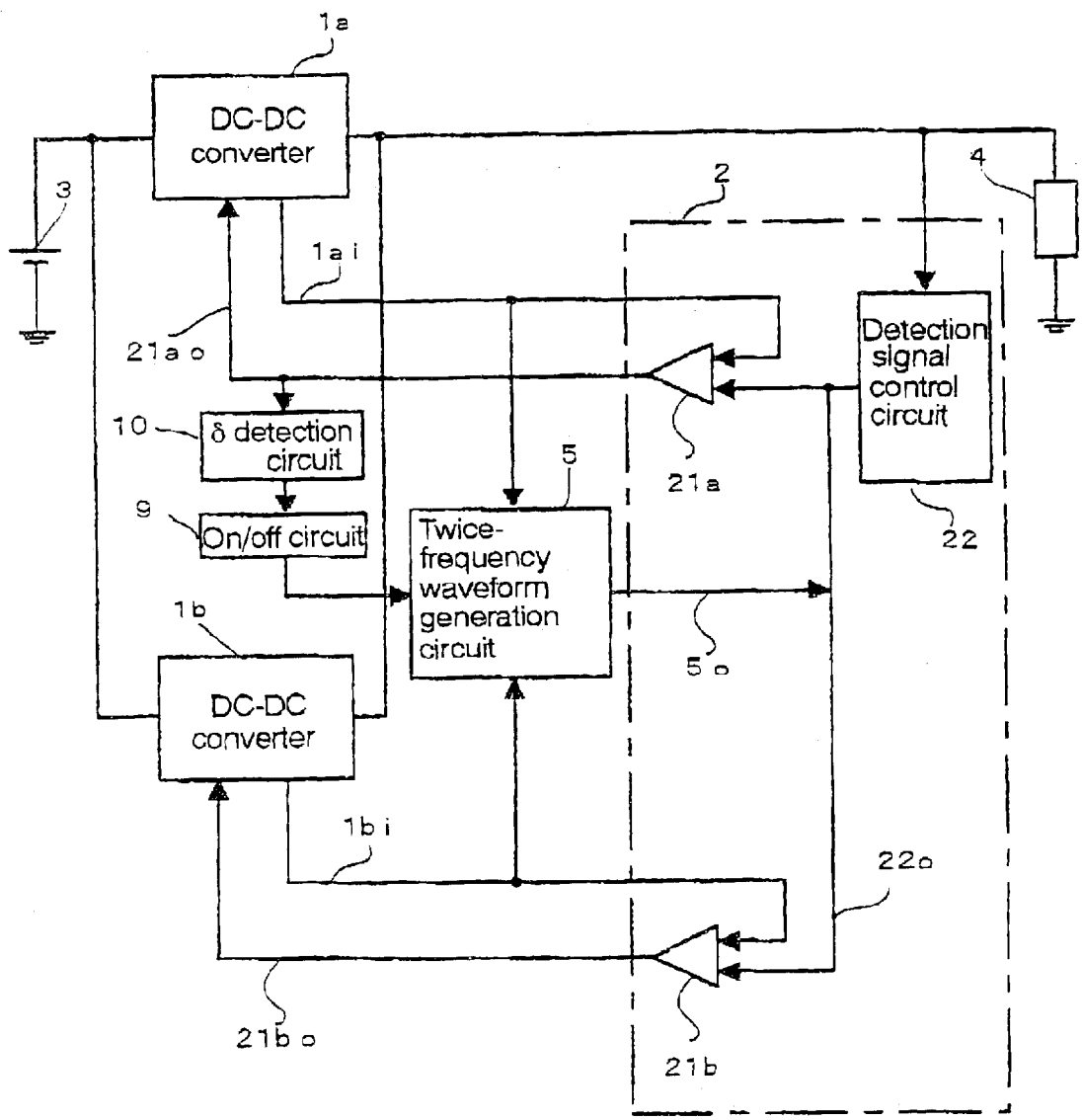
FIG. 24 is a block diagram of a switching power supply of a seventh embodiment of the present invention.

The following section describes a switching power supply of a seventh embodiment of the present invention while referring to FIG. 24 to FIG. 27B. FIG. 24 shows a block diagram of the switching power supply of the present embodiment. The present embodiment is different from the switching power supply of the first embodiment only in that a $\delta$ detection circuit 10, and the on/off circuit 9. The $\delta$ detection circuit 10 receives the output 21ao from the comparator 21a in the current mode control circuit 2. The on/off circuit 9 turns on/off the output 5o from the twice-frequency waveform generation circuit 5 connected with the output of the $\delta$ detection circuit 10. Since all the other parts have constitutions and functions identical to those in the first embodiment, the same reference numerals are assigned to these parts, descriptions therefor are not provided, and description is provided only for the added $\delta$ detection circuit 10 and on/off circuit 9.

Figure 25:
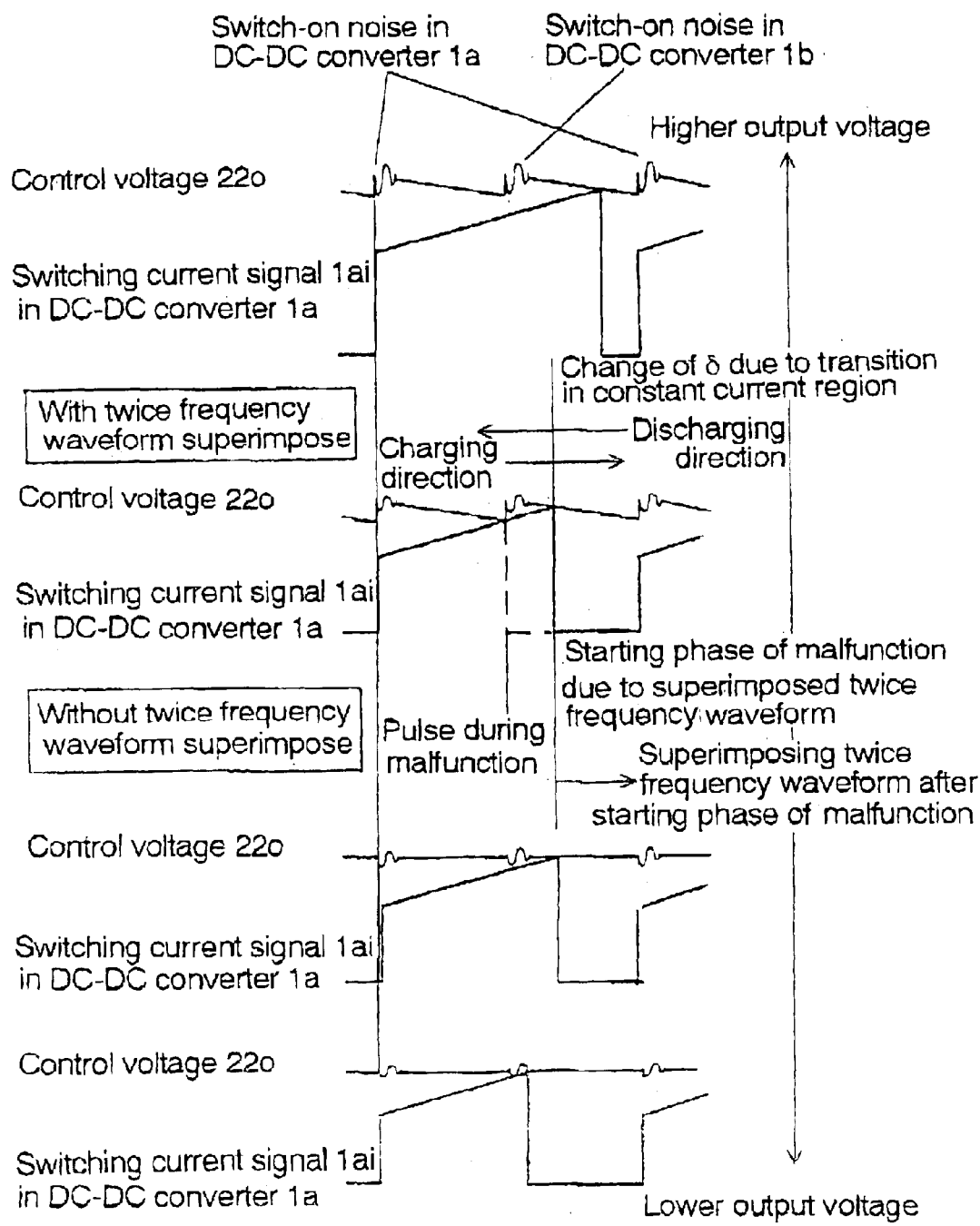
FIG. 25 shows changes of waveforms of the control voltage and the switching current signal in a constant current region of the seventh embodiment.
Figure 26A:
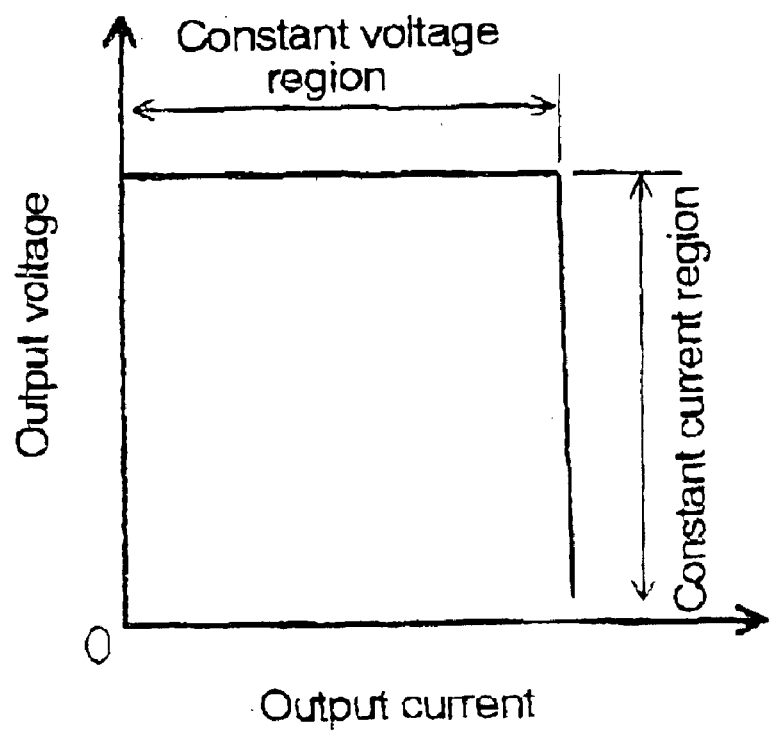
FIGS. 26A and 26B show output characteristics including those in the constant current region in the seventh embodiment.
Figure 26B:
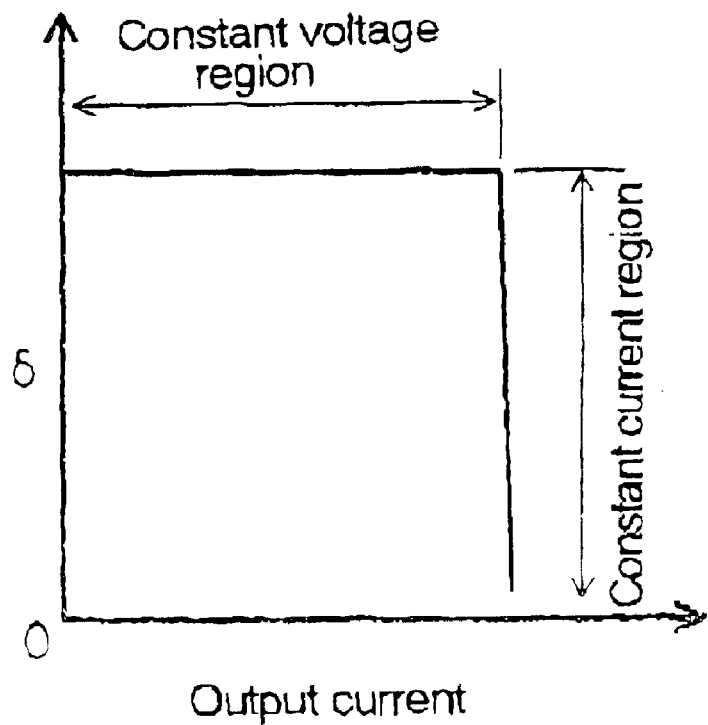
Figure 27A:
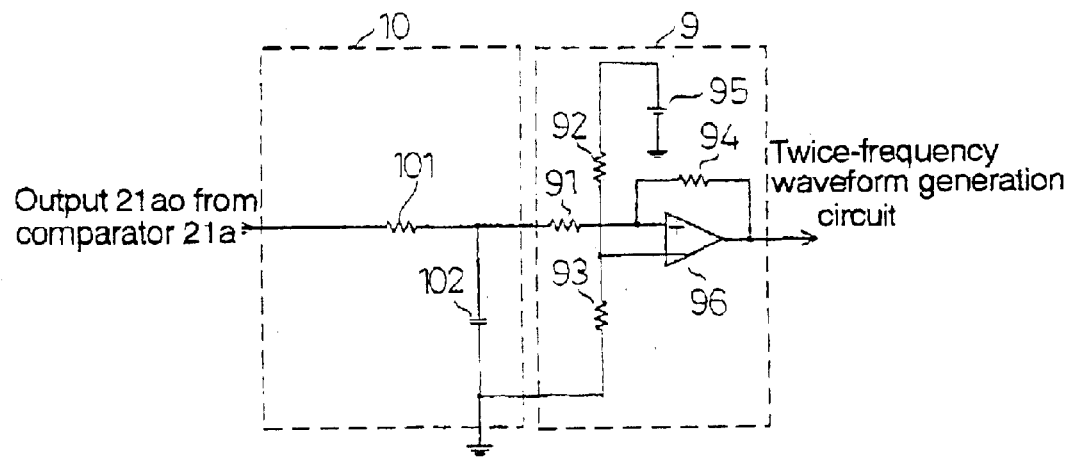
FIGS. 27A and 27B show an example of a specific constitution of the $\delta$ detection circuit and the on/off circuit in the seventh embodiment.
Figure 27B:
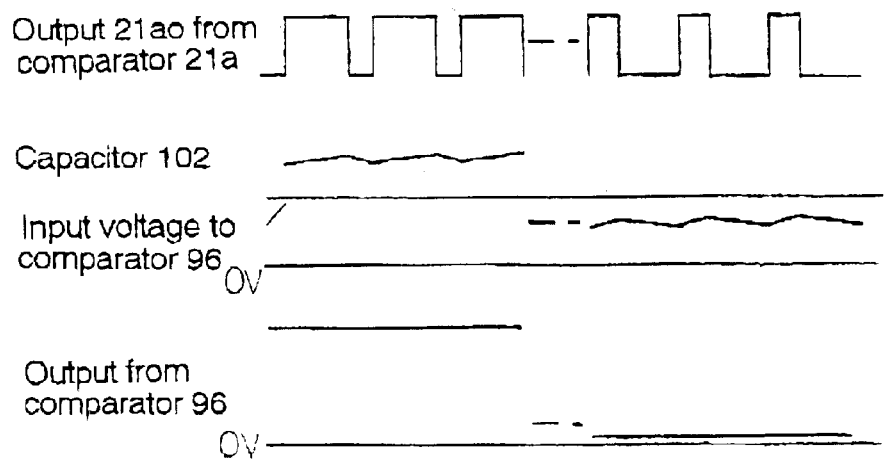

FIG. 25 shows changes of waveforms of the control voltage 22b and the switching current signal 1ai in a constant current region. FIG. 26A shows an output voltage current characteristic of the switching power supply including the constant current region, and FIG. 26B shows an output current/$\delta$ characteristic of the switching power supply. FIG. 27A shows an example of a specific constitution of the $\delta$ detection circuit 10 and the on/off circuit 9, and FIG. 27B shows waveforms at individual points.

In the present embodiment, the on/off circuit 9 operates so as to turn off the output 5o of the twice waveform generation circuit 5 when the δ characteristic changes largely in such a case that the output characteristic of the DC—DC converters 1a and 1b present a constant current characteristic. When the load 4 of the DC—DC converters 1a and 1b are a battery, the constant current characteristic is used as the output characteristic as shown in FIG. 26A. As shown in FIG. 26B, while δ hardly changes in the constant voltage region, δ changes largely in the constant current region. The twice frequency waveform superimposed on the control voltage 22o through the output 5o from the twice-frequency waveform generation circuit 5 prevents the decrease of the pulse width due to the switch-on noise from the DC—DC converter 1b. However, as described in the second embodiment, the malfunction is caused by the minimum electric potential of the superimposed waveform, and thus, the pulse lower limit phase sets the control range. The pulse lower limit phase beyond which the malfunction occurs is often included in the constant current control region depending on a condition for setting the constant current control region in charging a battery. The δ detection circuit 10 which receives the output 21ao from the comparator 21a detects the pulse width, and setting in the on/off circuit 9 turns off the output 5o of the twice-frequency waveform generation circuit 5 around a point where the pulse lower limit phase is reached in the present embodiment as shown in FIG. 24. In terms of a discharging direction of the battery, as shown in FIG. 25, when the output 5o from the twice-frequency waveform generation circuit 5 is not turned off, the pulse of the malfunction is generated. However, when the output 5o is turned off just before that phase, that phase is passed without the malfunction. In the constant current region, when δ decreases, the output voltage decreases simultaneously, and consequently the power decreases. Thus, the switch-on noise of the DC—DC converter 1b superimposed on the control voltage 22o decreases. As a result, the voltage decreases further. When the pulse becomes close to the width which is affected by the switch-on noise, since the amplitude of the superimposed switch-on noise is small, that phase is passed without the malfunction. In a charging direction, to the contrary, when the output 5o of the twice-frequency waveform generation circuit 5 is turned on after the pulse lower limit phase beyond which the malfunction occurs is passed, this pulse lower limit phase is passed without generating the malfunction.

The following section briefly describes an example of a specific constitution of the δ detection circuit 10 and the on/off circuit 9 while referring to FIG. 27A. The pulse output 21ao from the comparator 21a is averaged by the δ detection circuit 10 comprising a resistor 101 and a capacitor 102, and the averaged voltage is received by a comparator 96 through a resistor 91, and is compared with voltages set by the DC power supply 95, and resistors 92 and 93, thereby turning on/off the output of the comparator 96. The resistor 94 generates hysteresis characteristic for detection. This output is received by the capacitor 57 in the three-times frequency waveform generation circuit in FIG. 3A, the output from the comparator 96 becomes low so as to discharge the capacitor 57, thereby turning off the output 5o of the three-times frequency waveform generation circuit 5 when the pulse width from the comparator output 21ao is narrow, for example. FIG. 27B shows waveforms at the individual points at this time.

FIG. 27A shows an example of the δ detection circuit 10 and the on/off circuit 9. The δ detection circuit 10 and the on/off circuit 9 are constituted by various circuits, and are not limited to the present constitutions. While the comparator output 21ao is used as the input for the δ detection circuit 10 in the present embodiment, any signal which detects δ of the operation pulse of the DC—DC converter may be used.

As described above, when the current mode control circuit 2 operates under the constant current control for a battery load, for example, the δ detection circuit 10 and the on/off circuit 9 turn off the twice frequency waveform superimposed on the control voltage 22o for smooth constant current transition without the malfunction due to the superimposed twice frequency waveform in the present embodiment.

Thus, the switching power supply of the present embodiment constitutes an interleave type switching power supply which does not generate an irregular ripple fluctuation of the output voltage or current, and noise from the inductor components in the DC—DC converters, and presents no malfunction when the constant current control is required in such a case that the load is a battery.

(Eighth Embodiment)

Figure 28:
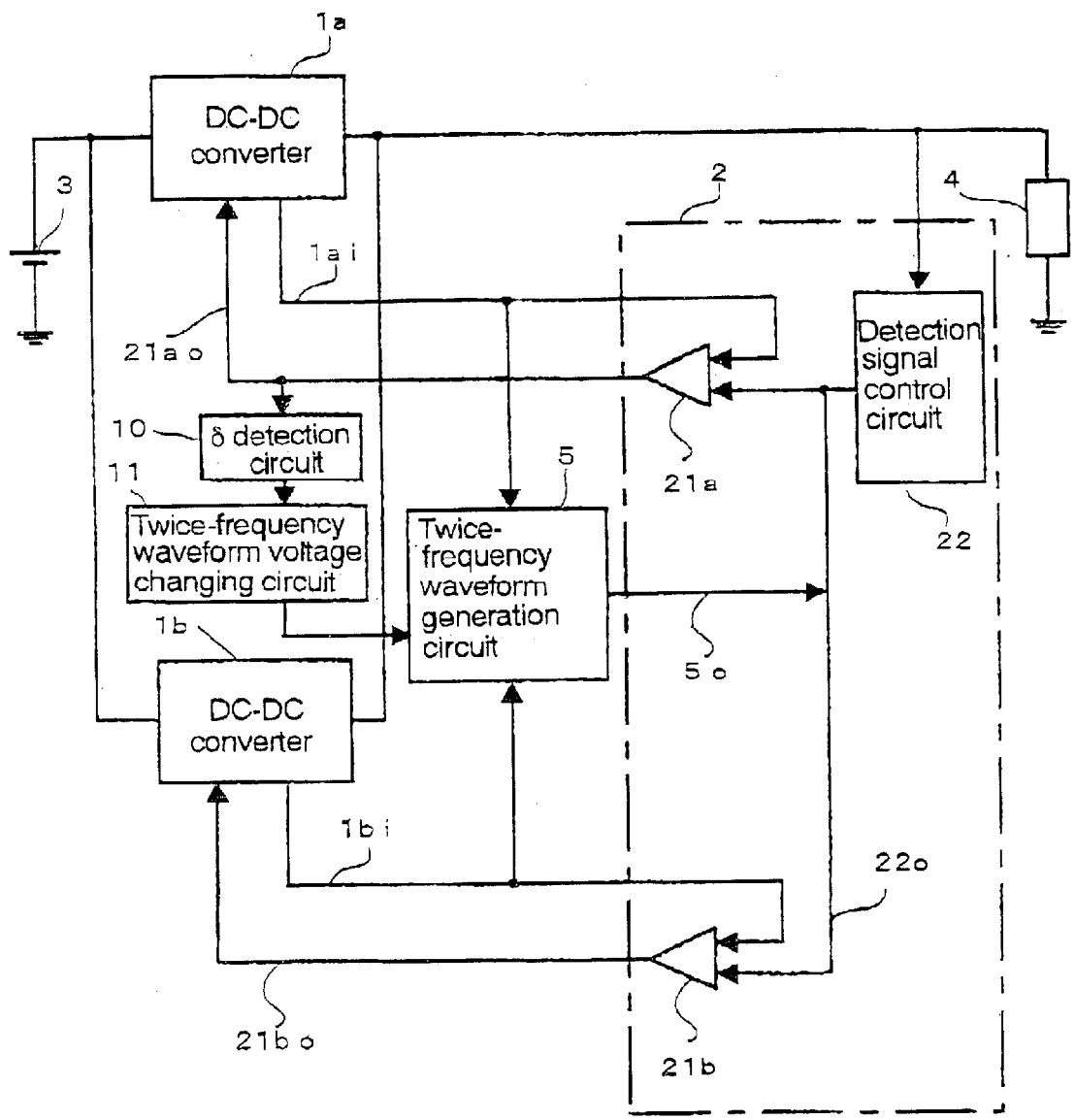
FIG. 28 is a block diagram of a switching power supply of an eighth embodiment of the present invention.
Figure 29:
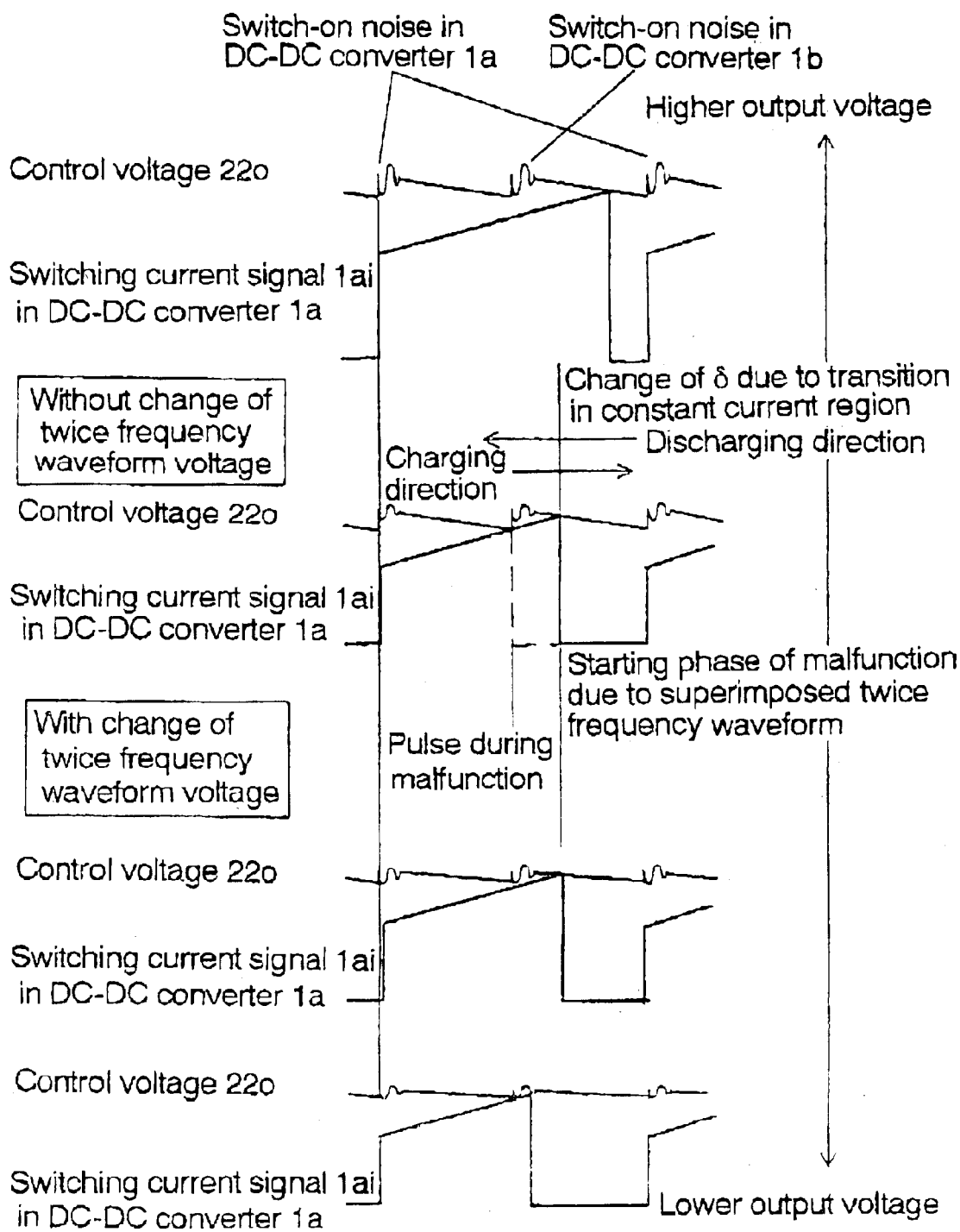
FIG. 29 shows changes of waveforms of a control voltage and a switching current signal in a constant current operation region of the eighth embodiment.

The following section describes a switching power supply of an eighth embodiment of the present invention while referring to FIG. 28 to FIG. 30B. FIG. 28 shows a block diagram of the switching power supply of the present embodiment. The voltage of the waveform of the output 5o from the twice-frequency waveform generation circuit 5 is changed by the twice-frequency waveform voltage changing circuit 11 in the present embodiment while the on/off circuit 9 turns on/off the output 5o from the twice-frequency waveform generation circuit 5 in the seventh embodiment. The present embodiment is different from the seventh embodiment only in this point. Since all the other parts have constitutions and functions identical to those in the seventh embodiment, the same reference numerals are assigned to these parts, descriptions therefor are not provided, and description is provided only for the twice-frequency waveform voltage changing circuit 11. FIG. 29 shows changes of waveforms of the control voltage 22o and the switching current signal 1ai in the constant current region. FIG. 30A shows a specific constitution example of the δ detection circuit 10 and the twice-frequency waveform voltage changing circuit 11, and FIG. 30B shows waveforms at individual points.

While the on/off circuit 9 turns off the output 5o of the twice-frequency waveform generation circuit 5 close to the point where the pulse lower limit phase set by the minimum electric potential of the twice frequency waveform superimposed on the control voltage 22o is reached in the seventh embodiment, the malfunction is prevented by using a voltage proportional to δ detected by the δ detection circuit 10 to reduce the waveform voltage of the output 5o from the twice-frequency waveform generation circuit 5 by the twice-frequency waveform voltage changing circuit 11 in the present embodiment. When the on/off circuit 9 turns on the output 5o from the twice-frequency waveform generation circuit 5 in the charging direction in the seventh embodiment, a voltage waveform larger than the specific superimposed voltage waveform may be impressed due to a circuit response depending on the constitution of the twice-frequency waveform generation circuit 5. In this case, the lowest voltage of this large impressed waveform decreases the pulse width of the comparator output 21ao, and then, the oscillation may stop. In the present embodiment, as shown in FIG. 29, since it is possible to apply the output 5o from the twice-frequency waveform generation circuit 5 with an amplitude proportional to δ detected by the δ detection circuit 10, the constant current transition without malfunction is possible as the charging direction.

The following section briefly describes an example of a specific constitution of the twice-frequency waveform voltage changing circuit 11 while referring to FIG. 30A. The twice-frequency waveform voltage changing circuit 11 constituted by the resistors 111, 112, 113, and 114, a DC power supply 117, a transistor 116, and a diode 115 converts a voltage proportional to δ averaged by the δ detection circuit 10 to a current proportional to δ. This output is supplied for the capacitor 57 in the three-times frequency waveform generation circuit in FIG. 3A, for example. When the pulse width of the comparator output 21ao is narrow, the charging current decreases, the amplitude of the charging voltage waveform of the capacitor 57 decreases, and consequently, the voltage waveform of the output 5o from the three-times frequency waveform generation circuit 5 becomes smaller. FIG. 30B shows waveforms at the individual points at this time. FIG. 30A is an example of the twice-frequency waveform voltage changing circuit 11. The twice-frequency waveform voltage changing circuit 11 is constituted by various circuits, and is not limited to this constitution. While the output from the δ detection circuit 10 is used as the input for the twice-frequency waveform voltage changing circuit 11 in the present embodiment, the control voltage 22o is used without problem.

As described above, when the current mode control circuit 2 operates under the constant current control for a battery load, for example, since the twice-frequency waveform voltage changing circuit 11 smoothly changes the twice frequency waveform voltage superimposed on the control voltage 22o, smooth constant current transition without the malfunction due to the superimposed twice frequency waveform is enabled in the present embodiment.

Thus, the switching power supply of the present embodiment constitutes an interleave type switching power supply which does not generate an irregular ripple fluctuation of the output voltage or current, and noise from the inductor components in the DC—DC converters, and presents no malfunction when the constant current control is required in such a case that the load is a battery.

(Ninth Embodiment)

Figure 31:
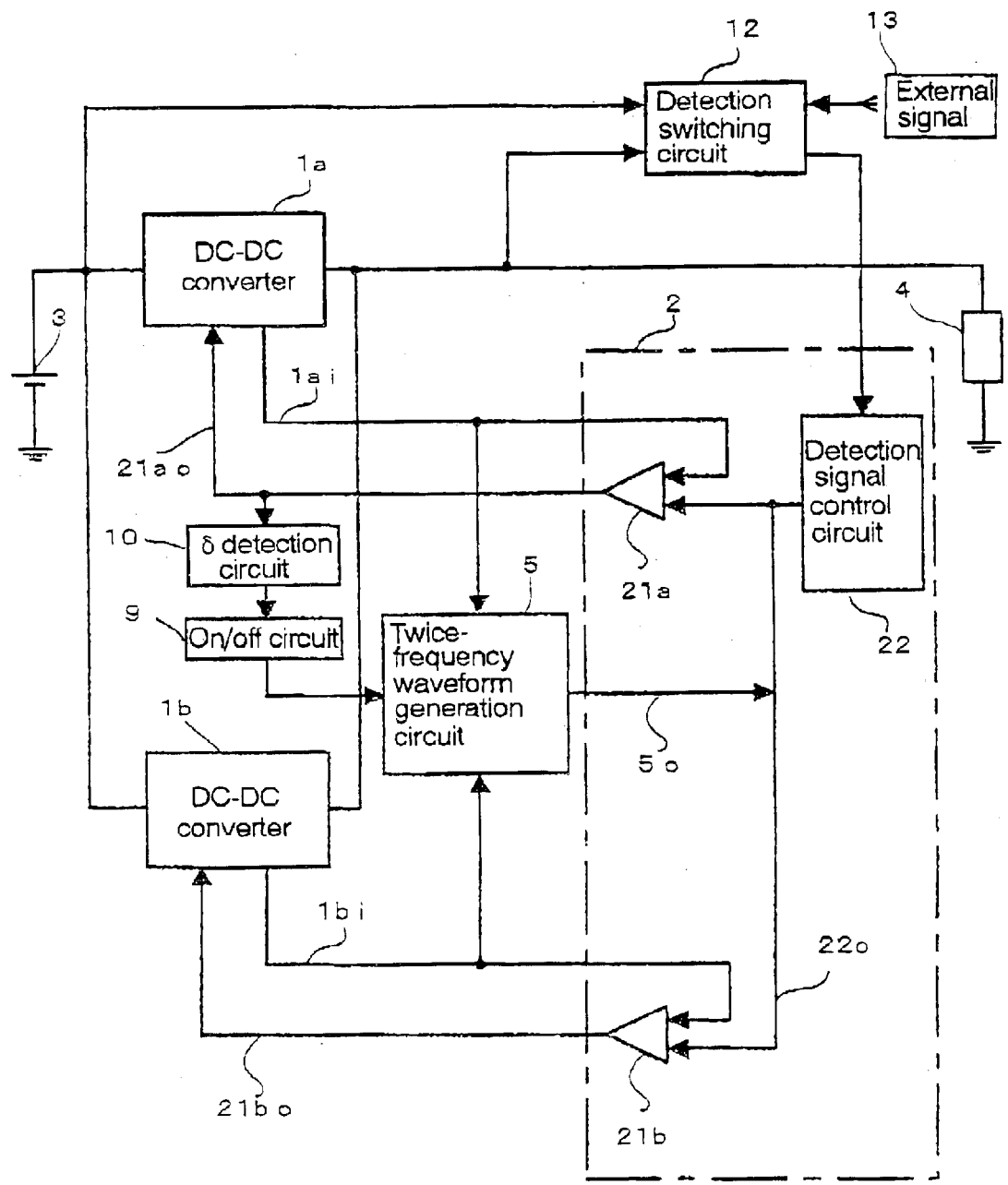
FIG. 31 is a block diagram of a switching power supply of a ninth embodiment of the present invention.
Figure 32:
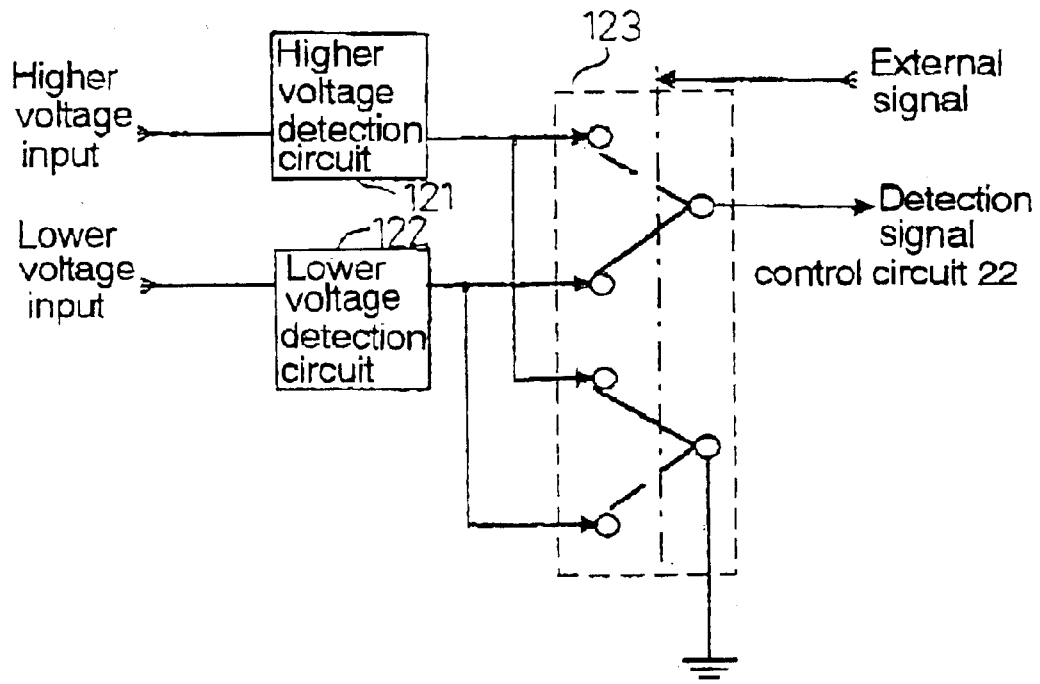
FIG. 32 is a block diagram for a detection switching circuit of the ninth embodiment.
Figure 33:
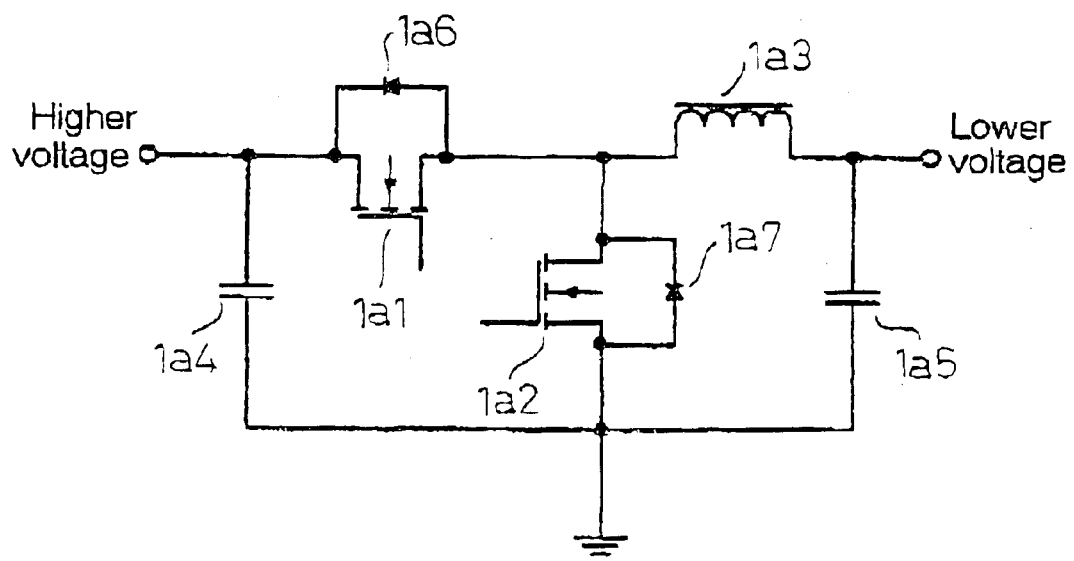
FIG. 33 is a circuit diagram showing an example of a specific constitution of a DC—DC converter including a bidirectional conversion function in the ninth embodiment.

The following section describes a switching power supply of a ninth embodiment of the present invention while referring to FIG. 31 to FIG. 33. FIG. 31 shows a block diagram of the switching power supply of the present embodiment. The present embodiment is different from the switching power supply of the seventh embodiment only in that a detection switching circuit 12 which is switched by an external signal 13 between controlling input and controlling output is added so as to constitute the DC—DC converters 1a and 1b to have a bidirectional conversion function. Since all the other parts have constitutions and functions identical to those in the seventh embodiment, the same reference numerals are assigned to these parts, descriptions therefor are not provided, and description is provided only for the detection switching circuit 12 switched by the external signal 13 between controlling input and controlling output, and the bidirectional conversion function of the DC—DC converters 1a and 1b.

FIG. 32 shows a block diagram for the detection switching circuit 12. FIG. 33 shows an example of a specific constitution of the DC—DC converters 1a and 1b having the bidirectional conversion function. The present embodiment allows the interleave type switching power supply under the current mode control in the seventh embodiment to provide the bidirectional conversion of the DC—DC converters 1a and 1b from a higher voltage to a lower voltage and from the lower voltage to the higher voltage by detection switching of the detection switching circuit 12 by the external signal 13. When the external signal 13 is not present, a switch 123 is in a state represented by solid lines, and an output from a higher voltage detection circuit 121 is grounded, and an output from a lower voltage detection circuit 122 is transmitted to the detection signal control circuit 22 in a block constitution example of the detection switching circuit 12 shown in FIG. 32. As a result, control for the lower voltage is conducted, and power is transmitted from the higher voltage to the lower voltage of the DC—DC converters 1a and 1b. When the external signal 13 is impressed, the switch 123 is changed to a state represented by broken lines, and an output from the higher voltage detection circuit 121 is transmitted to the detection signal control circuit 22. As a result, control for the higher voltage is conducted, and power is transmitted from the lower voltage to the higher voltage of the DC—DC converters 1a and 1b. For this bidirectional conversion, the DC power supply 3 and the load 4 need to be an energy accumulation part, or they need to be connected with an energy accumulation part.

In a Circuit shown in FIG. 33, switches 1a1 and 1a2 are turned on and off alternately. When the control for the lower voltage is conducted, the drive of the switch 1a1 is controlled so as to operate the circuit as a step-down circuit, and thus, the power is transmitted through a choke 1a3, a capacitor 1a5, the switch 1a2, and a diode 1a7. When the control for the higher voltage is conducted, the drive of the switch 1a2 is controlled so as to operate the circuit as a step-up circuit, and the power is transmitted through a switch 1a1, a diode 1a6, and a capacitor 1a4. FIG. 33 simply shows an example of a constitution of the DC—DC converter having the bidirectional conversion function, a circuit constitution having the bidirectional conversion function can be applied without problem whether the circuit constitution is isolated type or non-isolated type.

As described above, in the present embodiment, when the DC—DC converters 1a and 1b having the bidirectional conversion function conduct the bidirectional power supply operation based on the switching of the detection switching circuit 12 by the external signal, and a battery or the like connected with the input and output is charged with a constant current, the δ detection circuit 10 and the on/off circuit 9 turn off the twice frequency waveform superimposed on the control voltage 22o, and consequently, smooth constant current transition without the malfunction due to the superimposed twice frequency waveform is enabled.

Thus, the switching power supply of the present embodiment constitutes an interleave type switching power supply which does not generate an irregular ripple fluctuation of the output voltage or current, and noise from the inductor components in the DC—DC converters, and presents no malfunction owing to the bidirectional operation of the DC—DC converters when the constant current control is required in such a case that the input/output load is a battery.

With the switching power supply of the present invention, when the current mode control is conducted with the interleave constitution, the decrease of the control pulse width due to the superimposed switch-on noise of the other DC—DC converter is not generated. Thus, an interleave type switching power supply which does not generate the irregular ripple fluctuation of the output voltage or current and the noise from the inductor components in the DC—DC converter is realized.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A switching power supply comprising:
a current mode control circuit for controlling a switching current pulse by comparing a switching current signal or a signal proportional to the switching current signal with a control voltage;
N (wherein N is a natural number and N>1) DC—DC converters connected in parallel and controlled by the current mode control circuit; and
an N-times frequency waveform generation circuit for generating a waveform with a frequency N times of an oscillation frequency of the DC—DC converters in sync with the oscillation frequency, to superimpose the waveform on the control voltage.

2. A switching power supply comprising:
a current mode control circuit for controlling a switching current pulse by comparing a switching current signal or a signal proportional to the switching current signal with a control voltage;
N (wherein N is a natural number and N>1) DC—DC converters connected in parallel and controlled by the current mode control circuit; and
an N-times frequency waveform generation circuit for generating a waveform with a frequency N times of an oscillation frequency of the DC—DC converters in sync with the oscillation frequency, and simultaneously in phase with a turning-on phase of the switching current signal or a signal in phase with the switching current signal, to superimpose the waveform on the control voltage.

3. A switching power supply comprising:
a current mode control circuit for controlling a switching current pulse by comparing a switching current signal or a signal proportional to the switching current signal with a control voltage;
N (wherein N is a natural number and N>1) DC—DC converters connected in parallel and controlled by the current mode control circuit; and
an N-times frequency waveform generation circuit for generating a waveform with a frequency N times of en oscillation frequency of the DC—DC converters in sync with the oscillation frequency, and simultaneously in phase with a turning-off phase of the switching current signal or a signal in phase with the switching current signal, to superimpose the waveform on the control voltage.

4. A switching power supply comprising:
a current mode control circuit for controlling a switching current pulse by comparing a switching current signal or a signal proportional to the switching current signal with a control voltage;
N (wherein N is a natural number and N>1) DC—DC converters connected in parallel and controlled by the current mode control circuit; and
an N-times frequency waveform generation circuit for generating a waveform with a frequency N times of an oscillation frequency of the DC—DC converters in sync with the oscillation frequency, and simultaneously in phase with a phase arbitrarily delayed from a turning-on phase or a turning-off phase of the switching current signal or a signal in phase with the switching current signal, to superimpose the waveform on the control voltage.

5. A switching power supply comprising:
a current mode control circuit for controlling a switching current pulse by comparing a switching current signal or a signal proportional to the switching current signal with a control voltage;
two DC—DC converters connected in parallel and controlled by the current mode control circuit; and
a twice-frequency waveform generation circuit for generating a waveform with a frequency twice of an oscillation frequency of the DC-PC converters in sync with the oscillation frequency, and simultaneously in phase with a turning-on phase or a turning-off phase of the switching current signal or a signal in phase with the switching current signal, to superimpose the waveform on the control voltage, the twice-frequency waveform generation circuit also serving as a slope compensation circuit.

6. A switching power supply comprising:
a current mode control circuit for controlling a switching current pulse by comparing a switching current signal or a signal proportional to the switching currant signal with a control voltage;
N (wherein N is a natural number and N>1) DC—DC converters connected in parallel and controlled by the current mode control circuit; and
an next phase synchronized waveform generation circuit for generating a voltage waveform starting from a turning-on phase of the switching current signal of a (K+1)th DC—DC converter or a signal in phase with the switching current signal, and rising as time elapses, to superimpose the voltage waveform on the switching current signal or the signal proportional to the switching current signal of a Kth DC—DC converter.

7. A switching power supply comprising:
a current mode control circuit for controlling a switching current pulse by comparing a switching current signal or a signal proportional to the switching current signal with a control voltage;
N (wherein N is a natural number and N>1) DC—DC converters connected in parallel and controlled by the current mode control circuit; and
a (δ=0.5) synchronized waveform generation circuit for generating a voltage waveform starting from a phase delayed by 0.5 of an on-time ratio (δ) from a turning-on phase of the switching current signal of the DC—DC converter or a signal in phase with the switching current signals and rising as time elapses, to superimpose the voltage waveform on the switching current signal or the signal proportional to the switching current signal of the DC—DC converters.

8. A switching power supply comprising:
a current mode control circuit for controlling a switching current pulse by comparing a switching current signal or a signal proportional to the switching current signal with a control voltage;
N (wherein N is a natural number and N>1) DC—DC converters connected in parallel and controlled by the current mode control circuit;
an N-times frequency waveform generation circuit for generating a waveform with a frequency N tines of an oscillation frequency of the DC—DC converters in sync with the oscillation frequency, to superimpose the waveform on the control voltage; and
an on/off circuit for switching the N-times frequency waveform generation circuit between on and off.

9. A switching power supply comprising:

a current mode control circuit for controlling a switching current pulse by comparing a switching current signal or a signal proportional to the switching current signal with a control voltage;

N (wherein N is a natural number and N>1) DC—DC converters connected in parallel and controlled by the current mode control circuit;

an N-times frequency waveform generation circuit for generating a waveform with a frequency N times of an oscillation frequency of the DC—DC converters in sync with the oscillation frequency, to superimpose the waveform on the control voltage; and a changing circuit for increasing/decreasing an output level of the N-times frequency waveform generation circuit.

10. The switching power supply according to claim 8, wherein the on/off circuit operates based on detecting the on-time ratio (δ) of the DC—DC converters.

11. The switching power supply according to claim 8, wherein the current mode control circuit conducts constant current control.

12. The switching power supply according to claim 8, wherein the DC—DC converters have a bidirectional conversion function, and the current mode control circuit is switched between controlling the input and controlling the output or mode DC—DC converters based on an external signal.

13. The switching power supply according to claim 8, wherein a load or a power supply connected with an input or output of the DC—DC converter is a battery.

14. The switching power supply according to claim 1, wherein the output voltage waveform from the N-times frequency waveform generation circuit over one period decreases as time elapses.

15. The switching power supply according to claim 9, wherein the changing circuit operates based on detecting the on-time ratio (δ) of the DC—DC converters.

* * * * *

UNITED STATES PATENT AND TRADEMARK OFFICE
CERTIFICATE OF CORRECTION

PATENT NO. : 6,750,637 B2
DATED : June 15, 2004
INVENTOR(S) : T. Nagaki et al.

It is certified that error appears in the above-identified patent and that said Letters Patent is hereby corrected as shown below:

Title page,
Item [73], Assignee, after "Electric" insert -- Industrial --.

Column 21,
Line 43, "en" should be -- an --.

Column 22,
Line 48, "signals" should be -- signal, --.
Line 62, "tines" should be -- times --.

Column 24,
Line 8, "or mode" should be -- of the --.

Signed and Sealed this

Twenty-second Day of February, 2005

JON W. DUDAS
*Director of the United States Patent and Trademark Office*